US009560363B2

(12) United States Patent
Nakano et al.

(10) Patent No.: US 9,560,363 B2
(45) Date of Patent: Jan. 31, 2017

(54) IMAGE ENCODING DEVICE, PHOTOGRAPHING SYSTEM, PHOTOGRAPHING RECORDING SYSTEM, IMAGE ENCODING METHOD, AND NON-TRANSITORY COMPUTER READABLE MEDIUM STORING IMAGE ENCODING CONTROL PROGRAM

(71) Applicant: PANASONIC CORPORATION, Osaka (JP)

(72) Inventors: Satoshi Nakano, Fukuoka (JP); Manabu Nakamura, Fukuoka (JP); Jun Ikeda, Fukuoka (JP); Mari Yasuda, Fukuoka (JP); Tetsuo Tanaka, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 66 days.

(21) Appl. No.: 14/208,392

(22) Filed: Mar. 13, 2014

(65) Prior Publication Data

US 2014/0270719 A1    Sep. 18, 2014

(30) Foreign Application Priority Data

Mar. 15, 2013    (JP) ................. 2013-052737

(51) Int. Cl.
*H04N 5/917*    (2006.01)
*H04N 19/124*    (2014.01)
(Continued)

(52) U.S. Cl.
CPC ............ *H04N 19/124* (2014.11); *H04N 7/181* (2013.01); *H04N 19/154* (2014.11);
(Continued)

(58) Field of Classification Search
CPC .... H04N 7/181; H04N 19/198; H04N 19/124; H04N 19/154; H04N 19/177; H04N 19/172; G08B 13/19606; G08B 13/19667
(Continued)

(56) References Cited

U.S. PATENT DOCUMENTS 5,990,957 A    11/1999  Ryoo
6,763,138 B1    7/2004  Yokoyama
(Continued)

FOREIGN PATENT DOCUMENTS

JP    H10257489 A    9/1998
JP    2003018599 A    1/2003
(Continued)

OTHER PUBLICATIONS

Office Action issued in Japanese Counterpart Patent Appl. No. 2013-052737, dated Nov. 8, 2016.
English translation of Office Action issued in Japanese Counterpart Patent Appl. No. 2013-052737, dated Nov. 8, 2016.

*Primary Examiner* — William Tran
(74) *Attorney, Agent, or Firm* — Greenblum & Bernstein P.L.C.

(57) ABSTRACT

An image encoding device includes a degree of importance calculating unit that calculates a degree of importance on each of a plurality of input images which are consecutively input, a degree of importance period calculating unit that calculates a degree of importance period which is a period of the degree of importance, an average degree of importance calculating unit that calculates an average degree of importance which is an average of degrees of importance of times corresponding to a current in each of a plurality of previous degree of importance periods, an image quality control parameter calculating unit that calculates an image quality control parameter based on the average degree of importance, and an image encoding unit that encodes the
(Continued)

input image using the image quality control parameter and generates video data.

24 Claims, 15 Drawing Sheets

(51) Int. Cl.
| | |
|---|---|
| H04N 19/172 | (2014.01) |
| H04N 19/154 | (2014.01) |
| H04N 19/177 | (2014.01) |
| H04N 19/196 | (2014.01) |
| H04N 7/18 | (2006.01) |
| G08B 13/196 | (2006.01) |

(52) U.S. Cl.
CPC ......... *H04N 19/172* (2014.11); *H04N 19/177* (2014.11); *H04N 19/198* (2014.11); *G08B 13/19606* (2013.01); *G08B 13/19667* (2013.01)

(58) Field of Classification Search
USPC .......................................................... 386/328
See application file for complete search history.

(56) References Cited

U.S. PATENT DOCUMENTS

| | | | |
|---|---|---|---|
| 8,594,182 B1* | 11/2013 | Pardue | H04N 5/77 375/240.01 |
| 2003/0007696 A1 | 1/2003 | Saito | |
| 2007/0104462 A1* | 5/2007 | Saito | H04N 19/503 386/329 |
| 2008/0031538 A1* | 2/2008 | Jiang | H04N 1/4092 382/261 |
| 2008/0267286 A1 | 10/2008 | Kuroki et al. | |
| 2009/0034623 A1 | 2/2009 | kuroki | |
| 2010/0284568 A1* | 11/2010 | Tojo | G06K 9/00261 382/103 |
| 2011/0262039 A1* | 10/2011 | Du | G06K 9/00228 382/167 |
| 2013/0330055 A1* | 12/2013 | Zimmermann | G06F 17/30817 386/240 |

FOREIGN PATENT DOCUMENTS

| | | |
|---|---|---|
| JP | 3508916 | 1/2004 |
| JP | 2005-151485 | 6/2005 |
| JP | 2007325188 A | 12/2007 |
| JP | 2009-55341 | 3/2009 |
| JP | 2012239042 A | 12/2012 |

* cited by examiner

IMAGE ENCODING DEVICE, PHOTOGRAPHING SYSTEM, PHOTOGRAPHING RECORDING SYSTEM, IMAGE ENCODING METHOD, AND NON-TRANSITORY COMPUTER READABLE MEDIUM STORING IMAGE ENCODING CONTROL PROGRAM

FIELD

The present technology relates to an image encoding device that encodes a plurality of input images which are consecutively input and generates video data, a photographing system having the same, a photographing recording system, an image encoding method, and a non-transitory computer readable medium storing an image encoding program.

BACKGROUND AND SUMMARY

A monitoring camera is installed at a monitoring place to photograph and record a moving image of a monitoring target. In recording of a moving image of a monitoring target, a moving image to be recorded includes a frame having a high degree of importance, a frame having a low degree of importance, and a frame having an intermediate degree of importance together. For example, in the monitoring camera, a frame in which a person's face or a vehicle's license plate is photographed is an important frame, but a frame in which only a background is shown and a frame having little difference with a previous frame are a frame having a low degree of importance. Further, depending on the installation position of the monitoring camera, many frames having a high degree of importance may be photographed, or many frames having a low degree of importance may be photographed.

If it is possible to photograph and record an important frame at a high image quality and to photograph and record a frame having a low degree of importance at a low image quality when photographing and recording a moving image, it is possible to effectively use a limited memory capacity without damaging the purpose of monitoring, and it is possible to reduce a load of a network without damaging the purpose of monitoring even when a moving image is transmitted. Here, as a factor influencing an image quality of a moving image, there are a frame rate of a moving image and a compression rate in an encoding unit.

In the past, a method of adjusting an image quality according to a degree of importance of a moving image has been proposed (for example, see JP 2009-55341 A). According to the method of the related art, when a plurality of monitoring cameras are installed, it is possible to set an image quality of each monitoring camera according to a degree of importance by setting a recording period of time and a degree of importance (which is represented by an integer value of 1 to 10) of each monitoring camera in advance. Further, even when the number of monitoring cameras has been increased or even when the capacity of a recording device has been changed, an image quality can be adjusted only by resetting a recording period of time and a degree of importance.

Further, according to the method of the related art, by setting a degree of importance of a certain periodic time zone in advance, it is possible to dynamically adjust an image quality, for example, it is possible to change a degree of importance according to a time zone.

However, the method of the related art has the following problems. One is a problem caused as it depends on a hunch to represent a degree of importance by a numerical value in advance, and another is a problem caused as a temporal change in a degree of importance is fixedly set in advance. The problems will be described below.

FIG. 14 is a graph illustrating an example of a change in a degree of importance when a monitoring camera is installed in a retail store. A solid line represents a change in an actual degree of importance. For example, the actual degree of importance is calculated based on the number of visitors. The actual degree of importance increases after 8:00 which is an opening time of the retail store, and decreases before 22:00 which is a closing time. In the method of the related art, a degree of importance is set based on the actual degree of importance such that a degree of importance is high in a time zone of 8:00 to 22:00 which are opening hours, and a degree of importance is low in the remaining time zones, as indicated by a dotted line.

FIG. 15 is a graph illustrating an example of a change in a degree of importance when a monitoring camera is installed in a retail store. In the graph of FIG. 15, actual degrees of importance of different seasons are added to the graph of FIG. 14. In FIG. 15, an alternate long and short dash line represents a change in an actual degree of importance in winter, and a solid line represents a change in an actual degree of importance in summer. If winter is compared with summer, opening hours of winter and summer are the same, that is, from 8:00 to 22:00, but summer is higher in a degree of importance, longer in a time zone, and steeper in rising, and larger in a peak size than winter.

As described above, when a degree of importance is simply set based on opening hours or the like depending on a hunch, the set degree of importance does not match the actual degree of importance in the peak size or the change inclination. Further, the number of visitors used to calculate the degree of importance is influenced by a season such as a daylight-saving time or daylight hours, and also influenced by a surrounding environment such as attending and leaving time of schools or attending and leaving time of companies. Thus, when a temporal change in a degree of importance is fixedly set in advance, it is difficult to cope with a change of a season or a surrounding environment.

Furthermore, when a degree of importance is determined from a moving image to adjust an image quality, if there is a determination error, there is a case in which it is difficult to set a high image quality when a moving image needs to be displayed at a high image quality. For example, when a face detection result is used as a degree of importance, if a person passes in front of a monitoring camera while looking away from it, there is a problem in that it is difficult to detect a face, and it is difficult to switch to a high image quality.

The present technology was made in light of the above problems, and it is desirable to provide an image encoding device, an image encoding method, and an image encoding program which are capable of encoding a moving image using a parameter according to a change in an actual degree of importance, an imaging device that sets a degree of importance according to a change in an actual degree of importance and photographs a moving image, an image encoding device that sets a degree of importance according to a change in an actual degree of importance, a photographing system having the same, a photographing recording system, an image encoding method, and an image encoding program.

An image encoding device according to the present technology includes an image quality control parameter calculating unit that calculates an image quality control parameter based on a degree of importance of a past time corresponding to a current time in a degree of importance period which is a period of a degree of importance of a plurality of input images which are consecutively input, and an image encoding unit that encodes the input images using the image quality control parameter and generates video data.

A photographing system according to the present technology includes the image encoding device, an imaging unit that photographs a subject and generates a video signal, and a signal processing unit that processes the video signal and generates the input image.

A photographing recording system according to the present technology includes the photographing system, and a recording device that is connected to perform communication with the photographing system, and records video data generated by the image encoding device.

An image encoding method according to the present technology includes calculating an image quality control parameter based on a degree of importance of a past time corresponding to a current time in a degree of importance period which is a period of a degree of importance of a plurality of input images which are consecutively input, and encoding the input images using the image quality control parameter and generating video data.

An image encoding program according to the present technology causes a computer to function as an image quality control parameter calculating unit that calculates an image quality control parameter based on a degree of importance of a past time corresponding to a current time in a degree of importance period which is a period of a degree of importance of a plurality of input images which are consecutively input, and an image encoding unit that encodes the input images using the image quality control parameter and generates video data.

According to the present technology, an image quality control parameter is decided using a degree of importance of a corresponding time in a previous degree of importance period, and thus it is possible to encode an input image using a parameter according to a change in an actual degree of importance and generate video data.

As will be described below, there are other embodiments in the present technology. Thus, the disclosure is intended to provide a part of the present technology and not intended to limit the scope of the technology described and claimed herein.

DETAILED DESCRIPTION OF NON-LIMITING EXAMPLE EMBODIMENTS

Figure 1:
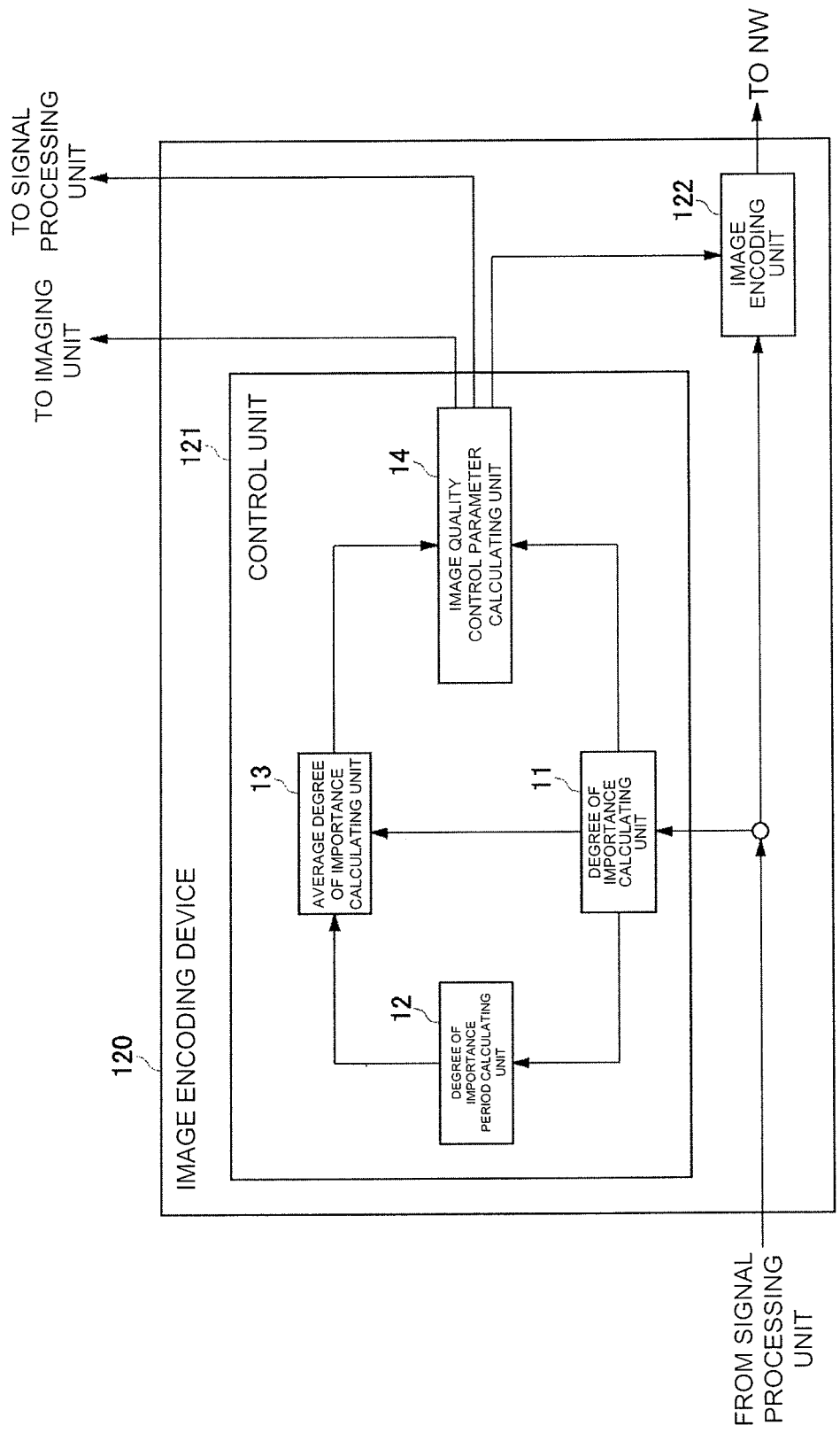
FIG. 1 is a block diagram illustrating a configuration of an image encoding device according to a first embodiment of the present technology.

Hereinafter, photographing recording systems according to embodiments of the present technology will be described in detail with reference to the appended drawings. The following embodiments are examples for carrying out the present technology, and the present technology is not limited to concrete configurations described below. When the present technology is carried out, a concrete configuration according to an embodiment may be appropriately employed.

An image encoding device according to the present technology is configured to include an image quality control parameter calculating unit that calculates an image quality control parameter based on a degree of importance of a past time corresponding to a current time in a degree of importance period which is a period of a degree of importance of a plurality of input images which are consecutively input and an image encoding unit that encodes the input images using the image quality control parameter and generates video data. Through this configuration, an image quality control parameter is decided using a degree of importance of a corresponding time in a previous degree of importance period, and thus it is possible to encode an input image using an image quality control parameter according to a change in an actual degree of importance and generate video data.

In the image encoding device, the image quality control parameter calculating unit may calculate the image quality control parameter based on an average degree of importance which is an average of degrees of importance of a plurality of past times corresponding to the current time in the degree of importance period. Through this configuration, it is possible to decide an image quality control parameter using degrees of importance of a plurality of corresponding times in a degree of importance period.

The image encoding device may further include an average degree of importance calculating unit that calculates the average degree of importance based on the degrees of importance of the plurality of past times corresponding to the current time in the degree of importance period. Through this configuration, in the image encoding device, it is possible to calculate the average degree of importance.

The image encoding device may further include a degree of importance calculating unit that calculates the degree of importance based on the input images and a degree of importance period calculating unit that calculates the degree of importance period based on the degree of importance. Through this configuration, the image encoding device can calculate the degree of importance period based on the input image without depending on the user.

In the image encoding device, the image quality control parameter calculating unit may calculate the image quality control parameter based on a degree of importance of a past time corresponding to the current time using an operating period of time of the image encoding device in one day as the degree of importance period. Through this configuration, it is possible to calculate the image quality control parameter without a configuration of calculating a degree of importance period from an input image.

In the image encoding device, the image quality control parameter calculating unit may calculate the image quality control parameter based on a degree of importance of a past time corresponding to the current time using an operating period of time of the image encoding device in one week as the degree of importance period. Through this configuration, it is also possible to calculate the image quality control parameter without a configuration of calculating a degree of importance period from an input image.

In the image encoding device, the image quality control parameter calculating unit may calculate the image quality control parameter further based on a current degree of importance which is a degree of importance of an input image of the current time calculated by the degree of importance calculating unit. Through this configuration, since the image quality control parameter is decided according to a current degree of importance as well as a previous degree of importance, when a degree of importance is usually low but a degree of importance is currently high, it is possible to perform flexible image quality control of increasing an image quality.

In the image encoding device, the image quality control parameter calculating unit may calculate the image quality control parameter to be proportional to an average of the current degree of importance and the average degree of importance corresponding to a plurality of periods. Through this configuration, it is possible to decide the image quality control parameter using the current degree of importance and the average degree of importance in the complex manner.

In the image encoding device, the image quality control parameter calculating unit may calculate the image quality control parameter to be proportional to a large one of the current degree of importance and the average degree of importance. Through this configuration, even when the current degree of importance is erroneously calculated to be low, it is possible to decide an appropriate image quality control parameter based on a previous average degree of importance.

In the image encoding device, the image quality control parameter calculating unit may calculate the image quality control parameter based on a comparison between the current degree of importance and the average degree of importance and a comparison between the current degree of importance or the average degree of importance and a certain threshold value. Through this configuration, it is possible to decide the image quality control parameter according to a situation in which an abnormal situation different from a normal situation occurs, a situation in which the current degree of importance is erroneously calculated, or the like.

In the image encoding device, the image quality control parameter calculating unit may calculate the image quality control parameter to be proportional to the average degree of importance based on only the average degree of importance. Through this configuration, it is possible to decide the image quality control parameter regardless of the current degree of importance. Further, the current degree of importance is reflected in the average degree of importance later.

The image encoding device may further include a complexity calculating unit that calculates complexity of the video data generated by the image encoding unit, a complexity period calculating unit that calculates a complexity period which is a period of the complexity, and an average image complexity calculating unit that calculates an average image complexity in a period of an integer multiple of the complexity period, wherein the image quality control parameter calculating unit calculates the image quality control parameter based on the average image complexity. Through this configuration, since an occurrence coincidence amount in which the image quality control parameter is decided is controlled based on the complexity period of the video data, it is possible to record encoding data corresponding to a certain period of time in a recording medium having a certain memory capacity. An example of the period of the integer multiple of the complexity period includes a period equal to the complexity period, that is, an original complexity period.

In the image encoding device, the degree of importance calculating unit may calculate the degree of importance based on whether a certain subject is included in the input image. Through this configuration, it is possible to calculate a degree of importance based on a certain subject such as a person's face or a vehicle license plate included in an input image.

In the image encoding device, the degree of importance calculating unit may calculate the degree of importance based on a model of a subject of a certain type and the input image. Through this configuration, it is possible to calculate a high degree of importance for an input image including a subject of a certain type by using a person's face, a vehicle license plate, or the like as a subject of a certain type and comparing the model of the subject with the input image.

In the image encoding device, the degree of importance calculating unit may calculate the degree of importance based on a comparison between a certain image and the input image. Through this configuration, it is possible to calculate a high degree of importance for an input image including a subject appropriate as a certain face image or a license plate using a certain face image or a vehicle license plate image as a certain image.

In the image encoding device, the degree of importance calculating unit may calculate the degree of importance based on a magnitude of a temporal change of the input image and/or a magnitude of a spatial change of the input image. Through this configuration, it is possible to calculate complexity (the magnitude of a change between previous and next frames) or a degree of congestion (the number of portions that have changed in an image) of an image as a degree of importance.

In the image encoding device, the period of the integer multiple of the complexity period may be a common period which is an integer multiple of the degree of importance period. Through this configuration, since a change in a generated coding amount caused by a change in a degree of importance is also nearly constant in each common period, it is possible to control a generated coding amount in a common period.

In the image encoding device, an image encoding unit may include a quantizer, and the image quality control parameter may be a quantization parameter in the quantizer. Through this configuration, it is possible to adjust an image quality of video data by adjusting the quantization parameter.

In the image encoding device, the image quality control parameter may be a parameter representing whether an input image is to be encoded in the image encoding unit. Through this configuration, it is possible to adjust an image quality of video data according to the necessity of encoding.

The photographing system according to the present technology may be configured to include the image encoding device, an imaging unit that photographs a subject and generates a video signal, and a signal processing unit that processes the video signal and generates the input image. Through this configuration, an image quality control parameter is decided using a degree of importance of a corresponding time in a previous degree of importance period, and thus it is possible to encode an input image using an image quality control parameter according to a change in an actual degree of importance and generate video data.

In the photographing system, the image quality control parameter may be a photographing frame rate in the imaging unit. Through this configuration, it is possible to adjust an image quality of video data by adjusting the frame rate.

In the photographing system, the image quality control parameter may be a resolution used to generate the input image in the signal processing unit. Through this configuration, it is possible to adjust an image quality of video data by adjusting the resolution.

A photographing recording system according to the present technology may be configured to include the photographing system and a recording device that is connected to perform communication with the photographing system, and records video data generated by the image encoding device. Through this configuration, an image quality control parameter is decided using a degree of importance of a corresponding time in a previous degree of importance period, and thus it is possible to encode an input image using an image quality control parameter according to a change in an actual degree of importance and generate video data, and it is possible to effectively use the memory capacity of recording device.

An image encoding method according to the present technology includes calculating an image quality control parameter based on a degree of importance of a past time corresponding to a current time in a degree of importance period which is a period of a degree of importance of a plurality of input images which are consecutively input, and encoding the input images using the image quality control parameter and generating video data. Through this configuration, an image quality control parameter is decided using a degree of importance of a corresponding time in a previous degree of importance period, and thus it is possible to encode an input image using an image quality control parameter according to a change in an actual degree of importance and generate video data.

An image encoding program according to the present technology causes a computer to function as an image quality control parameter calculating unit that calculates an image quality control parameter based on a degree of importance of a past time corresponding to a current time in a degree of importance period which is a period of a degree of importance of a plurality of input images which are consecutively input, and an image encoding unit that encodes the input images using the image quality control parameter and generates video data. Through this configuration, an image quality control parameter is decided using a degree of importance of a corresponding time in a previous degree of importance period, and thus it is possible to encode an input image using an image quality control parameter according to a change in an actual degree of importance and generate video data.

First Embodiment

Figure 2:
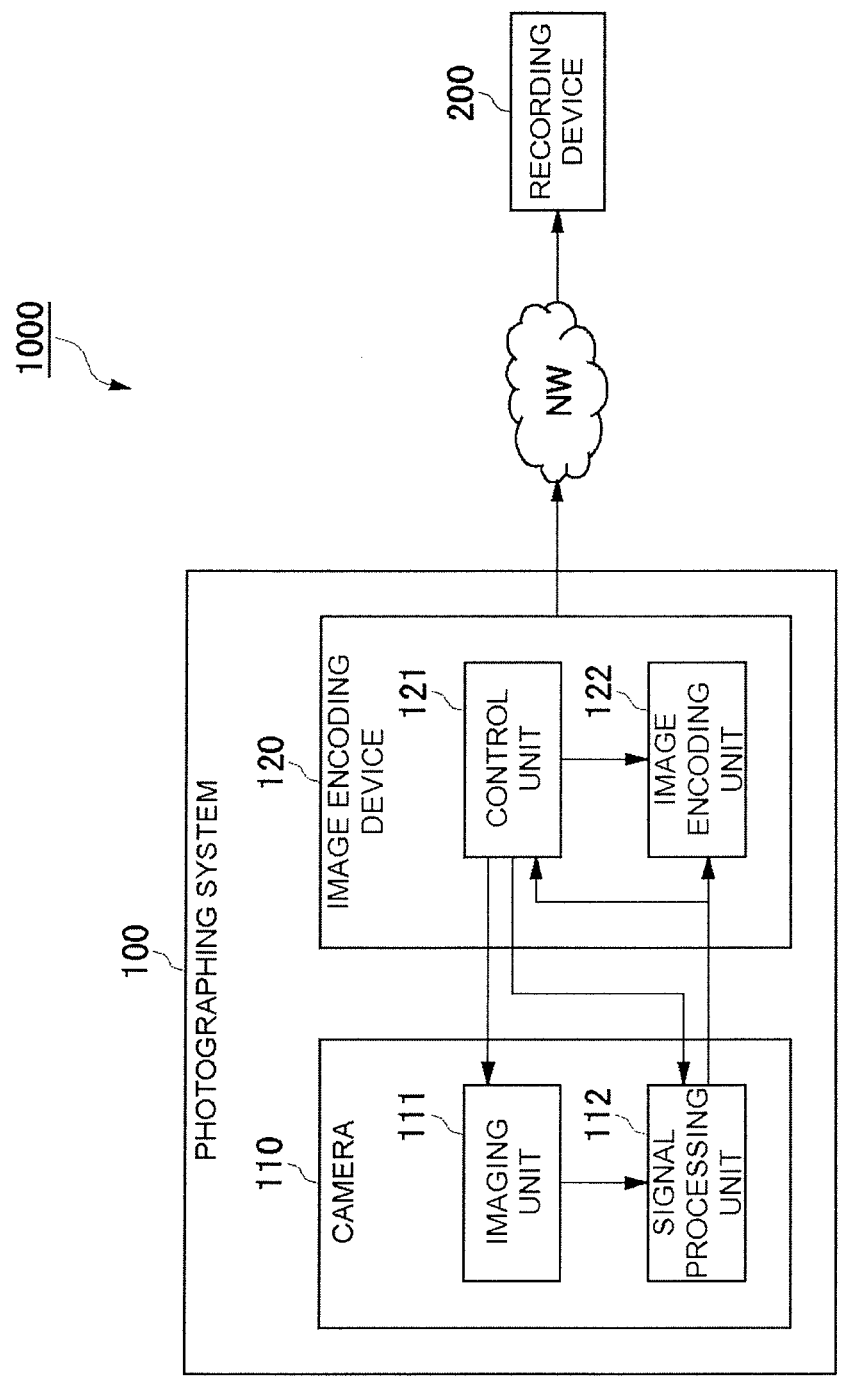
FIG. 2 is a block diagram illustrating a configuration of a photographing recording system according to the first embodiment of the present technology.

FIG. 2 is a block diagram illustrating a configuration of a photographing recording system according to an embodiment of the present technology. A photographing recording system 1000 includes a photographing system 100 and a recording device 200. The photographing system 100 includes a camera 110 and an image encoding device 120. The camera 110 is connected to the image encoding device 120, and the image encoding device 120 is connected to the recording device 200 via a network NW. The network NW need not be necessarily interposed between the image encoding device 120 and the recording device 200, and for example, the recording device 200 may be equipped in the photographing system 100.

The photographing recording system 1000 may be applied as a monitoring video recording system that records a video of a monitoring camera installed in, for example, a store. In this case, the camera 110 serving as a monitoring camera is installed to photograph, for example, an area near the entrance of the store, the image encoding device 120 is installed in, for example, a store office, the recording device 200 is installed at a monitoring center, and the image encoding device 120 and the recording device 200 perform communication with each other via the Internet. Through this configuration, a monitoring video photographed by the camera 110 is recorded in the recording device 200.

The camera 110 includes an imaging unit 111 and a signal processing unit 112. The imaging unit 111 is a common photographing unit including a lens, an imaging element, and the like. The imaging element photographs a subject at a set frame rate (for example, 1/30 seconds), and outputs a video signal in units of frames. The signal processing unit 112 performs signal processing such as a resolution adjustment or a brightness or color adjustment on the video signal output from the imaging element, and outputs the processed video signal (frame image) to the image encoding device 120.

The frame image generated by the camera 110 is consecutively input to the image encoding device 120 as an input image. The image encoding device 120 encodes the input image and generates a plurality of encoding data configuring video data. The plurality of generated encoding data is transmitted to the recording device 200 via the network NW. The recording device 200 includes a recording medium having a certain memory capacity, and records the plurality of encoding data (video data) transmitted via the network NW in the recording medium.

The image encoding device 120 includes a control unit 121 and an image encoding unit 122. The control unit 121 decides and outputs an image quality control parameter used to control an image quality of the video data generated by the photographing system 100. In the photographing system 100 of the present embodiment, the image quality control parameter is output to the imaging unit 111, the signal processing unit 112, and/or the image encoding unit 122.

FIG. 1 is a block diagram illustrating a configuration of an image encoding device according to an embodiment of the present technology. The image encoding device 120 includes the control unit 121 and the image encoding unit 122 as described above. The configuration of the image encoding device 120 illustrated in FIG. 1 may be implemented by executing an image encoding program according to an embodiment of the present technology through a computer.

The input image is consecutively input to the image encoding device 120, and input to the control unit 121 and the image encoding unit 122. The image encoding unit 122 encodes the input image and generates the video data. In the quantizing process of the image encoding unit 122, a quantization parameter is variable, and as the quantization parameter increases, the image quality of the video data to be generated decreases, whereas as the quantization parameter decreases, the image quality of the video data to be generated increases.

The control unit 121 includes a degree of importance calculating unit 11, a degree of importance period calculating unit 12, an average degree of importance calculating unit 13, and an image quality control parameter calculating unit 14. The input image is input to the degree of importance calculating unit 11.

The degree of importance calculating unit 11 calculates a degree of importance on each of a plurality of the input images which are consecutively input (on each frame image). Here, a degree of importance of a frame can be expressed as the height of the necessity of recording the frame at a high image quality. Specifically, when the photographing recording system 1000 or the photographing system 100 is applied as the monitoring system of the retail store, a main subject is a person, a product, and currency, a degree of importance calculation source is a person's face, paper currency, and a coin, and a frame in which a person's face, paper currency, or a coin is shown is determined to be high in a degree of importance. In this case, the degree of importance calculating unit 11 has a model of a subject of a certain type such as a person's face, paper currency, or a coin, performs matching between the model and an input frame, and may use a matching score (a degree at which a person's face or the like is recognized) as a degree of importance.

In addition to this example, a degree at which a license plate is recognized may be used as the degree of importance according to the use. Further, the degree of importance calculating unit 11 may calculate the number of matching between the person's face or the license plate and the model in a certain period of time (the number of times in which a matching score is a certain threshold value or more), that is, the number of visitors visiting a store or the number of passing vehicles in a certain period of time as the degree of importance. Further, the degree of importance calculating unit 11 stores a list of target images such as a certain face, clothes, a physique, and a vehicle type, and performs matching between the input frame and the target images, and may calculate a matching score or the number of matching as the degree of importance. In other words, the degree of importance calculating unit 11 may calculate the degree of importance based on matching between the input image and the model may calculate the degree of importance based on matching between the input image and a certain target image.

Further, the degree of importance calculating unit 11 may simply calculate a degree of complexity of an image (the magnitude of a change between previous and next frames, that is, the magnitude of a temporal change) or a degree of congestion (the number of changed portions in an image, that is, the magnitude of a spatial change) as the degree of importance without performing the above-described matching. Further, the degree of importance calculating unit 11 may calculate the degree of importance based on a complex combination of various kinds of factors described above.

As described above, the degree of importance calculating unit 11 calculates the degree of importance based on various kinds of factors, but a method of calculating the degree of importance is appropriately set according to the use. For example, as described above, when the camera 110 is installed in a retail store, a main subject can be a person, a product, and currency, and a person's face, paper currency, and currency can be the degree of importance calculation source. Thus, when the camera 110 is installed, for example, in front of a doorway, a passage, an escalator, or an elevator of a retail store, a video of a thief can be recorded at a high image quality. Further, when the camera 110 is installed at a cash desk and paper currency is photographed, it is possible to record the moment of transfer of money at a high image quality.

When the camera 110 is installed on a street, a main subject can be a person or a vehicle, and a person's face, a physique, clothes, a license plate, a vehicle type, a vehicle color, or the like shown in an image can be the degree of importance calculation source. Thus, when the camera 110 is installed in downtown, it is possible to record a certain person at a high image quality based on a person's face, a physique, clothes, or the like. Further, it is possible to record a certain vehicle at a high image quality based on a license plate, a vehicle type, a vehicle color, or the like.

Further, when the camera 110 is installed in a parking lot, a main subject can be a person or a vehicle, and a person's face or license plate can be the degree of importance calculation source. Thus, when the camera 110 is installed at a doorway of a parking lot or at the position at which the parking lot is overlooked, it is possible to record a corresponding vehicle at a high image quality as evidence when a fee is not paid or there is a trouble in the parking lot.

Further, when the camera 110 is installed in an apartment complex, a main subject can be a person, and a person's face, a physique, or clothes can be the degree of importance calculation source. Thus, when the camera 110 is set at a parking lot for bicycles or a garbage dump, it is possible to record a person who illegally dumps waste at a high image quality.

The degree of importance calculating unit 11 outputs the calculated degree of importance to the image quality control parameter calculating unit 14, and the image quality control parameter calculating unit 14 calculates an image quality control parameter based on the degree of importance calculated by the degree of importance calculating unit 11. The image quality control parameter calculating unit 14 according to the present embodiment detects a change period of a degree of importance, and calculates the image quality control parameter in view of a degree of importance of a time zone in a previous period (before one to n periods) correlated to a current time.

To this end, the control unit 121 includes the degree of importance period calculating unit 12 and the average degree of importance calculating unit 13, and the degree of importance calculating unit 11 outputs the calculated degree of importance to the degree of importance period calculating unit 12 and the average degree of importance calculating unit 13.

For example, when the camera 110 is a monitoring camera installed in a retail store, a change in a subject is periodic. In other words, a cycle in which visitors crowd during the daytime, and it is quiet during the night similarly to a still image having little movement is repeated. For example, when the magnitude of a change between frames is used as the degree of importance, the degree of importance of the daytime is high, and the degree of importance of the night is low, and a change in a degree of importance is repeated at a period of 24 hours.

Figure 3:
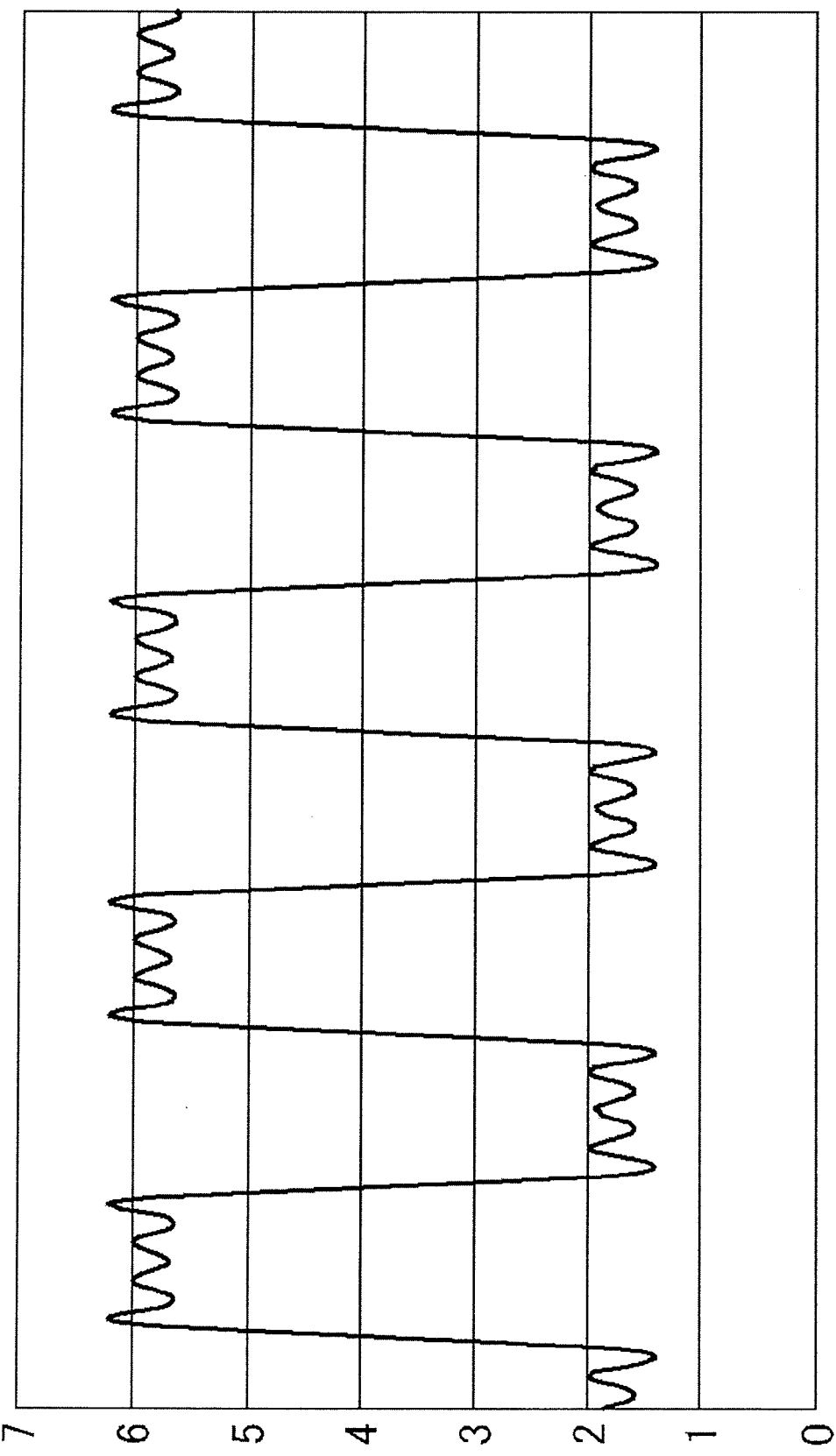
FIG. 3 is a graph illustrating an example of a change in a degree of importance according to the first embodiment of the present technology.

FIG. 3 is a graph illustrating an example of a change in a degree of importance. The degree of importance period calculating unit 12 receives the degree of importance calculated by the degree of importance calculating unit 11, and records the latest degree of importance during a certain previous period of time (for example, 600 hours). The degree of importance period calculating unit 12 performs periodic analysis on a temporal change in the recorded degree of importance, and calculates the degree of importance period. A known technique such as Fourier analysis or an auto-correlation function may be employed as the periodic analysis.

Figure 4:
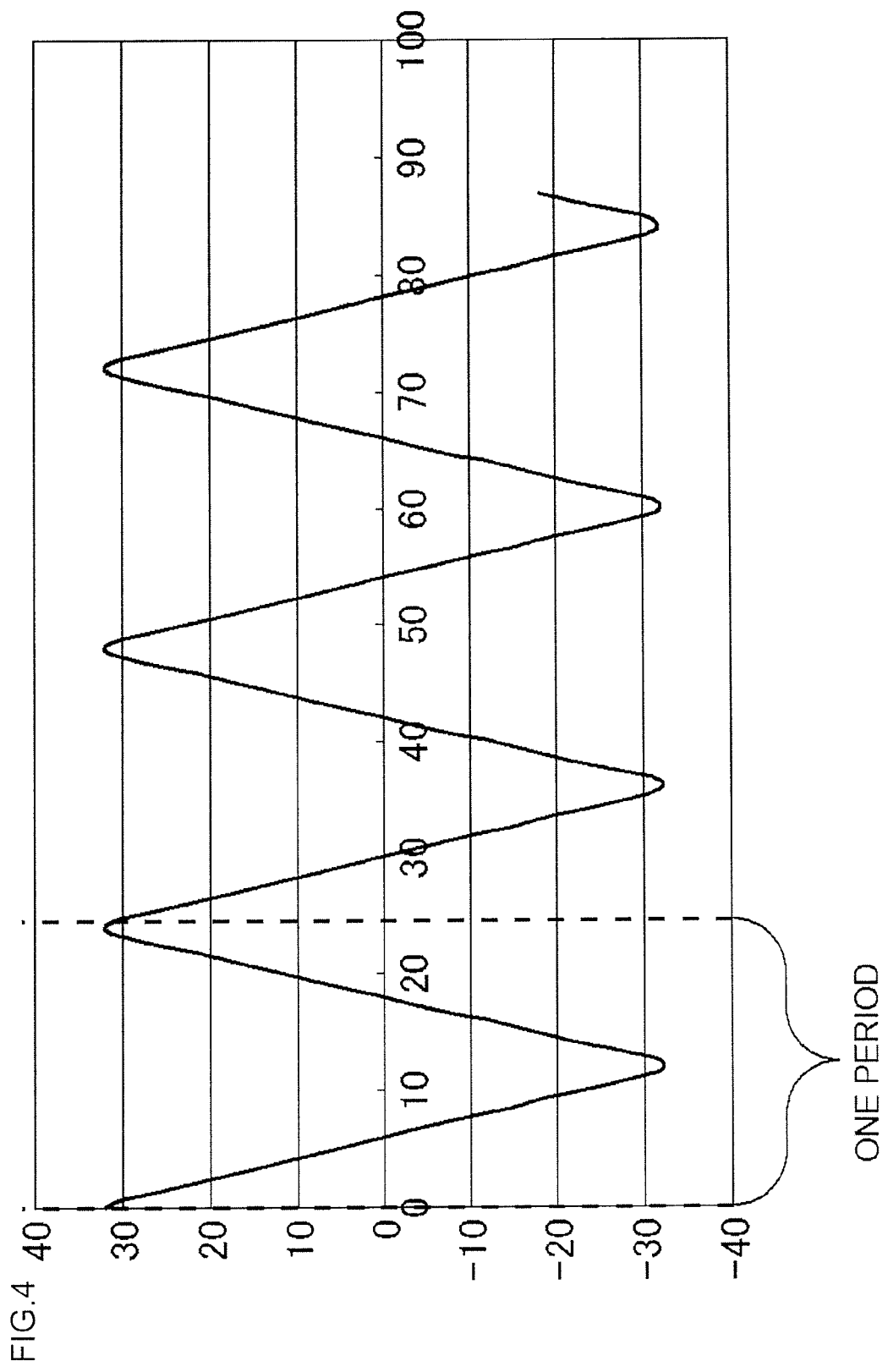
FIG. 4 is a graph obtained by performing periodic analysis by a degree of importance period calculating unit performing an auto-correlation function according to the first embodiment of the present technology.

FIG. 4 is a graph obtained by performing periodic analysis using an auto-correlation function on the example of FIG. 3 through the degree of importance period calculating unit 12. The degree of importance period calculating unit 12 calculates a period representing a peak value in the graph of FIG. 4 as a degree of importance period. When there are a plurality of periods having the same peak value, it is desirable to select a shortest period since it is possible to rapidly adapt to a change in a subject.

The degree of importance period calculating unit 12 calculates and updates the degree of importance at a certain timing as described above. For example, the degree of importance period calculating unit 12 may calculate and update the degree of importance period at the already calculated latest degree of importance period, may calculate and update the degree of importance period at intervals of a group of pictures (GOP) including a plurality of frames, or may calculate and update the degree of importance period at intervals of a certain period of time (for example, at intervals of one hours or at intervals of 24 hours). The degree of importance period calculating unit 12 outputs the calculated degree of importance period to the average degree of importance calculating unit 13.

Figure 5:
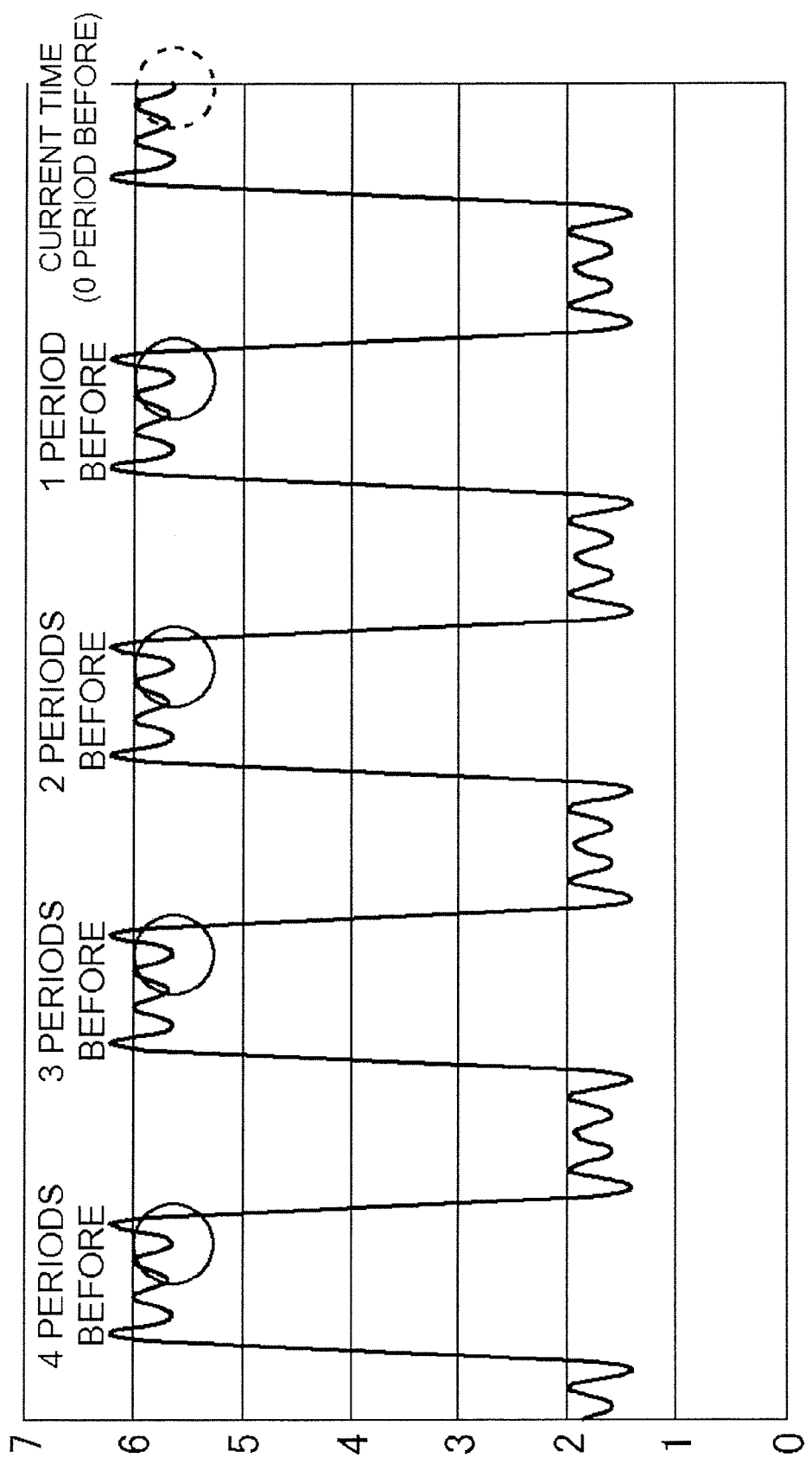
FIG. 5 is a graph illustrating degrees of importance of times in a plurality of previous degree of importance periods corresponding to a current time according to the first embodiment of the present technology.

The average degree of importance calculating unit 13 receives and records the degree of importance calculated by the degree of importance calculating unit 11. The latest degree of importance of a certain previous period of time (for example, 600 hours) is recorded in the average degree of importance calculating unit 13. The average degree of importance calculating unit 13 calculates and outputs an average of degrees of importance of times corresponding to a current time on each of a plurality of previous degree of importance periods. At this time, the degree of importance period calculated by the degree of importance period calculating unit 12 is employed as the length of one period. FIG. 5 is a graph illustrating degrees of importance of times corresponding to a current time in a plurality of previous degree of importance periods in the example of FIG. 3. A degree of importance surrounded by a cycle of a dotted line is a degree of importance of a current time, and a plurality of degrees of importance surrounded by circles of a solid line are degrees of importance of respective times corresponding to a current time in a plurality of previous degree of importance periods.

Specifically, when the (latest) degree of importance of the current time is received from the degree of importance calculating unit 11, the average degree of importance calculating unit 13 stores the (latest) degree of importance of the current time, extracts degrees of importance of a plurality of previous points in time obtained by going back by an integer multiple of the degree of importance period of the current time from the current time, averages the extracted degrees of importance, and calculates an average degree of importance. The average degree of importance calculating unit 13 outputs the calculated average degree of importance to the image quality control parameter calculating unit 14.

As described above, as the average degree of importance calculating unit 13 updates the average degree of importance using the latest degree of importance, and the degree of importance period calculating unit 12 also updates the degree of importance period, the image quality control parameter according to a change in an actual degree of importance can be effectively obtained. This is because a change form or a change period of a degree of importance may change according to a seasonal or social factor.

Figure 6:
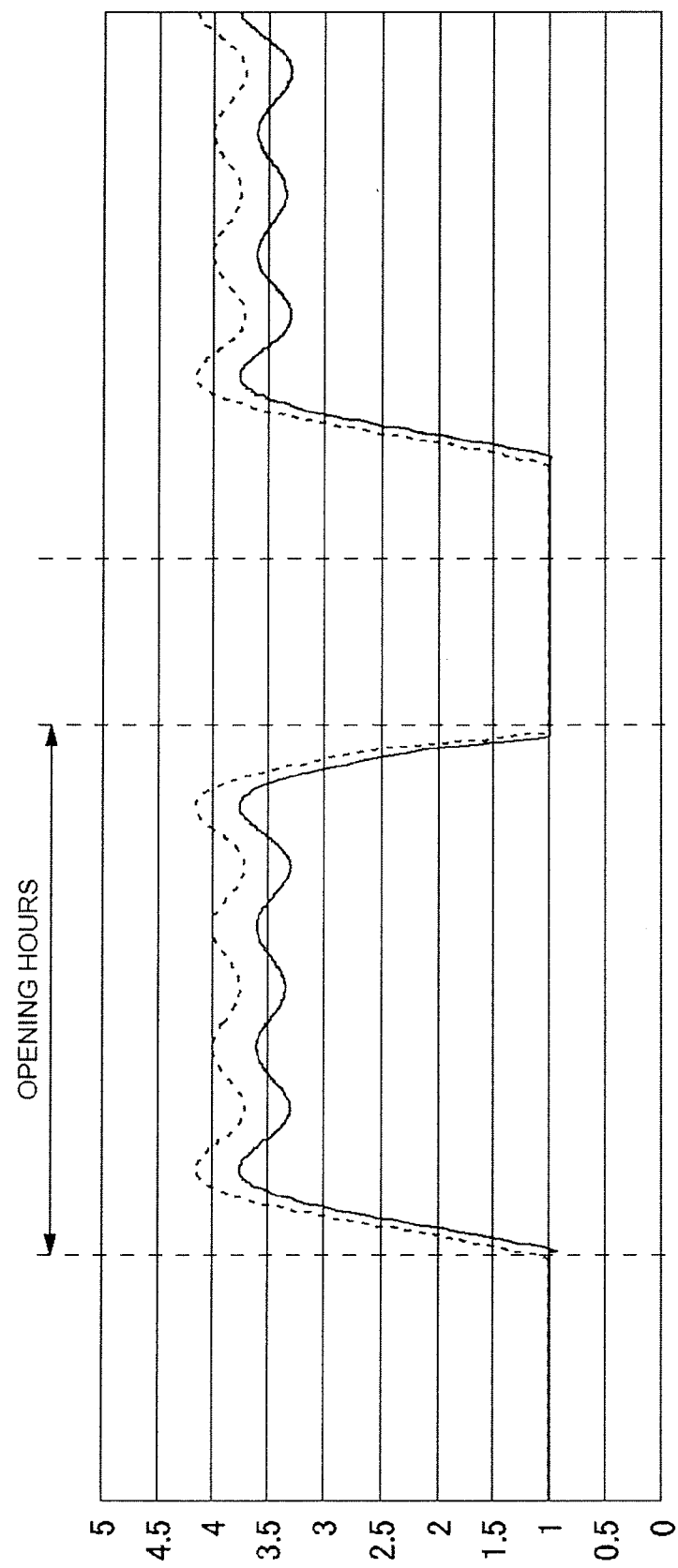
FIG. 6 is a graph illustrating an example (weekdays and weekends) of a change in a degree of importance according to the first embodiment of the present technology.
Figure 7:
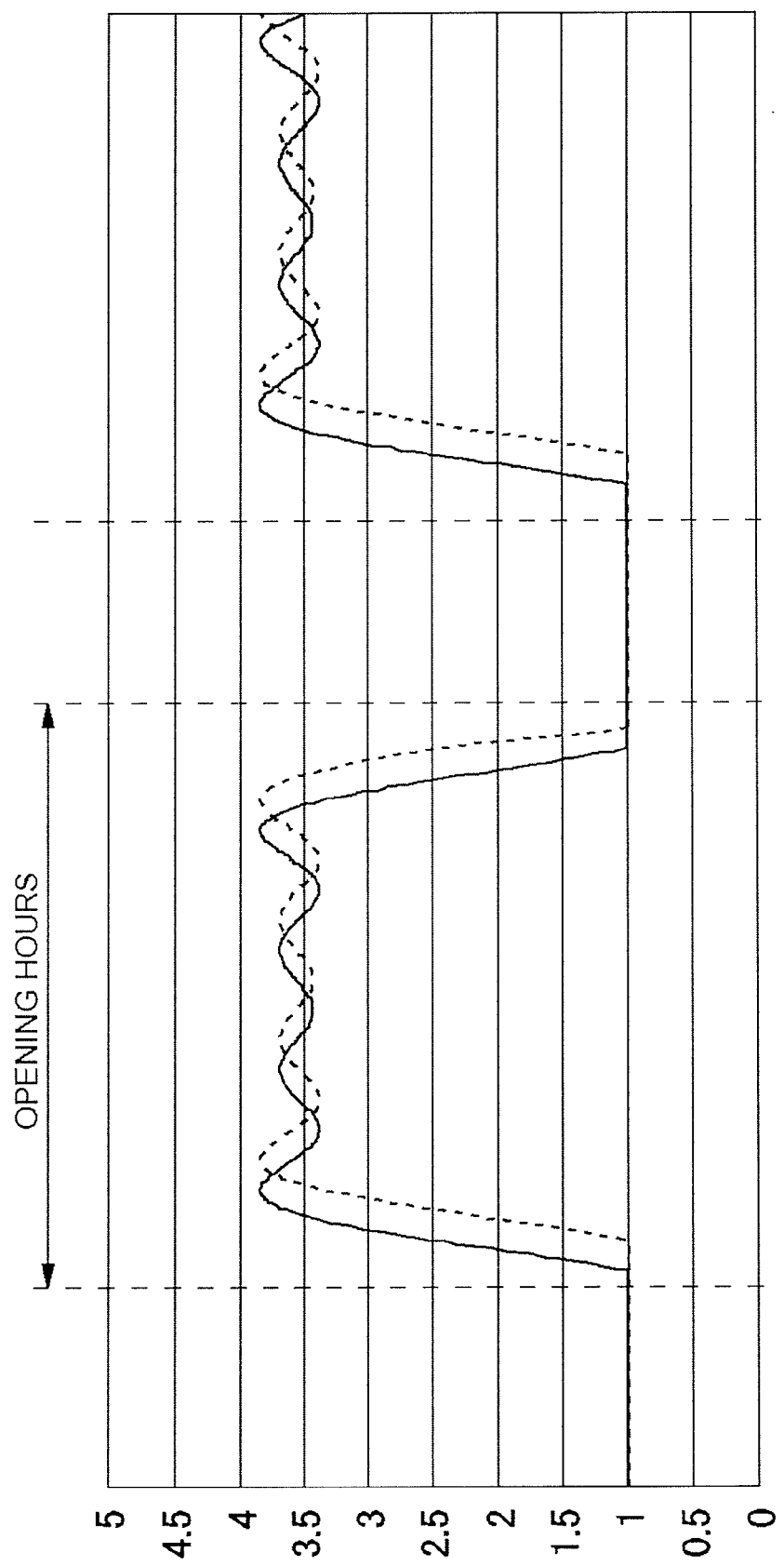
FIG. 7 is a graph illustrating an example (daylight-saving time and other time zones) of a change in a degree of importance according to the first embodiment of the present technology.
Figure 8:
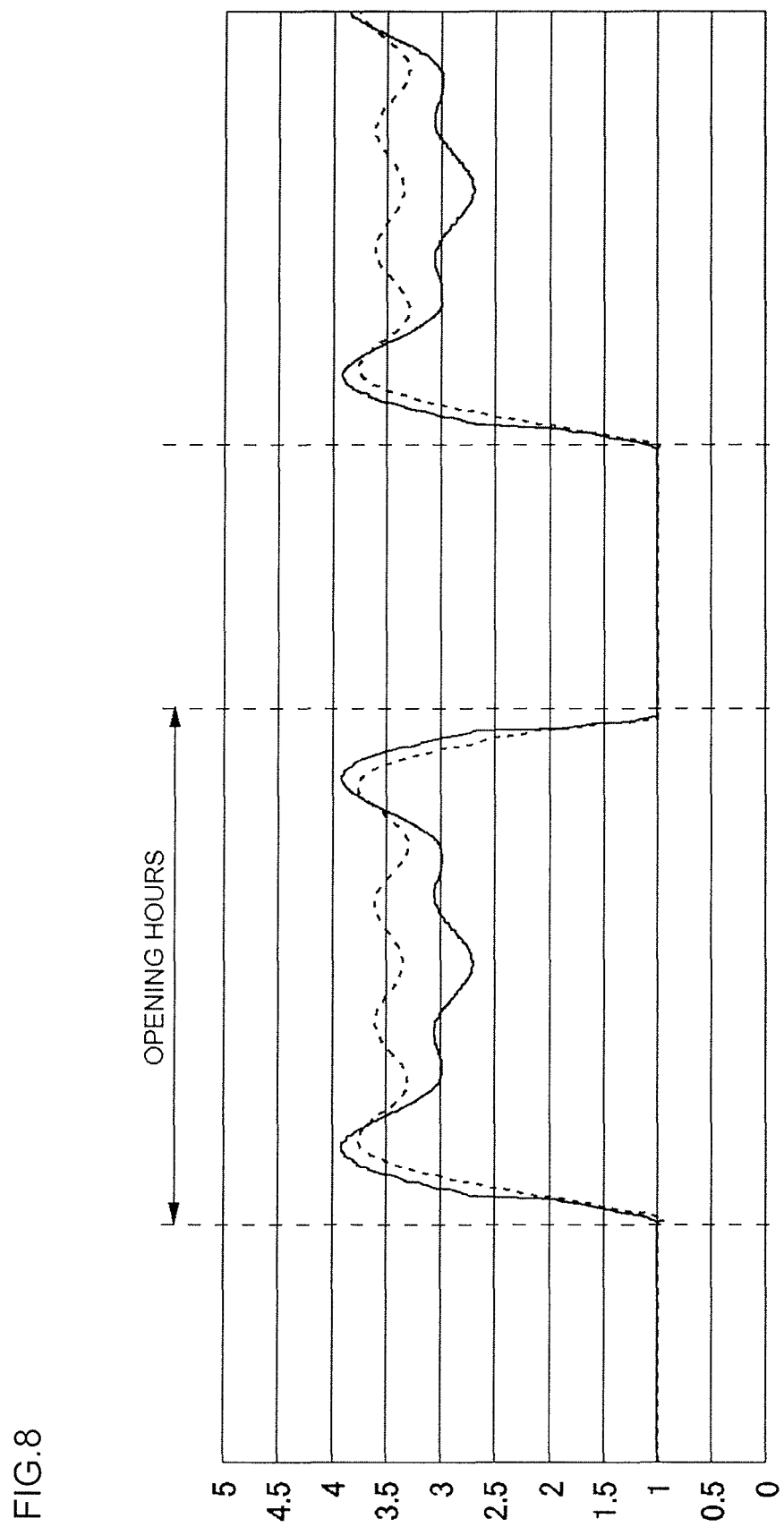
FIG. 8 is a graph illustrating an example (summer and winter) of a change in a degree of importance according to the first embodiment of the present technology.

FIGS. 6 to 8 are graphs illustrating a difference in a change form of a degree of importance. FIG. 6 illustrates a change (solid line) in a degree of importance for weekdays and a change (dotted line) in a degree of importance for the weekends. This example is regarded as, for example, a case in which a monitoring camera is installed at a retail store or on a road, and a person and a vehicle are detected and used as the degree of importance calculation source. As illustrated in FIG. 6, the weekends are generally higher in the degree of importance than the weekdays.

FIG. 7 illustrates a change (solid line) in a degree of importance during the daylight-saving time and a change (dotted line) in a degree of importance during the other periods of time. This example is also regarded as, for example, a case in which a monitoring camera is installed at a retail store or on a road, and a person and a vehicle are detected and used as the degree of importance calculation source. As illustrated in FIG. 7, the change in the degree of importance during the daylight-saving time is one in which the change in the degree of importance during the other periods of time is shifted to the past by one hour.

FIG. 8 illustrates a change (solid line) in a degree of importance in summer and a change (dotted line) in a degree of importance in winter. This example is regarded as, for example, a case in which a monitoring camera is installed at a retail store, a person (visitor) is detected, and the number of visitors is used as the degree of importance calculation source. As illustrated in FIG. 8, in summer, compared to winter, in a cool time zone in the morning and evening, the number of visitors increases, and the degree of importance is high, and in a hot time zone of the daytime, compared to winter, the number of visitors decreases, and the degree of importance is low.

As in the examples of FIGS. 6 to 8, the change form or the change period of the degree of importance is not consistently constant but may change. Besides, the change form or the change period of the degree of importance may change according to the following factors. For example, in summer, sunset is late, and a peak in the number of visitors is late, and in spring and autumn, since it is easy to go out, the number of visitors increases, in other words, the change form or the change period of the degree of importance may change according to a change in the number of visitors according to a season. In winter, due to influence of accumulated snow, a commuting time to work is shifted to an early time, and traffic increases in a main road in which snow is removed, in other words, the change form or the change period of the degree of importance may change according to a change in the number of commuters (vehicles) according to the weather. The change form or the change period of the degree of importance may change according to a change in a commuting form according to a culture or a habit such as a no-car day, weekends, or the end of month.

In this regard, the average degree of importance calculating unit 13 updates the degree of importance used to calculate the average degree of importance and updates the average degree of importance by taking a new degree of importance calculated by the degree of importance calculating unit 11 and discarding an old degree of importance in order. Similarly, the degree of importance period calculating unit 12 updates the degree of importance used to calculate the degree of importance period and updates the degree of importance period by taking the new degree of importance calculated by the degree of importance calculating unit 11 and discarding an old degree of importance in order.

The image quality control parameter calculating unit 14 receives a current degree of importance $I_{now}$ at the current time from the degree of importance calculating unit 11, receives a previous average degree of importance $I_{ave}$ corresponding to the current time from the average degree of importance calculating unit 13, and calculates an image quality control parameter Q based on the current degree of importance $I_{now}$ and the previous average degree of importance $I_{ave}$. As a method of calculating the image quality control parameter based on the current degree of importance $I_{now}$ and the average degree of importance $I_{ave}$, various methods are considered. The image quality control parameter calculating unit 14 may employ one of these methods or may appropriately change and employ the methods. Next, a calculation of the image quality control parameter based on the current degree of importance $I_{now}$ and the average degree of importance $I_{ave}$ will be described.

A first calculation method is a method using only the average degree of importance $I_{ave}$. In other words, the image quality control parameter calculating unit 14 calculates the image quality control parameter Q by the following Formula (1):

$$Q=Q_{ref} \times I_{ave} \qquad (1)$$

Wherein, $Q_{ref}$ refers to a reference image quality control parameter representing a reference image quality when the degree of importance is a certain reference value.

According to the first calculation method, the image quality control parameter Q is decided to be proportional to the previous average degree of importance. In the case of the first calculation method, since the current degree of importance $I_{ave}$ is unnecessary, the degree of importance calculating unit 11 need not output the current degree of importance $I_{ave}$ to the image quality control parameter calculating unit 14.

A second calculation method is a method using the current degree of importance $I_{now}$ and the average degree of importance $I_{ave}$ in the complex manner. In other words, the image quality control parameter calculating unit 14 calculates the image quality control parameter Q by the following Formula (2):

$$Q=Q_{ref} \times (I_{now}+I_{ave} \times n)/(n+1) \qquad (2)$$

In the calculation of the image quality control parameter by Formula (2), the image quality control parameter Q is calculated to be proportional to an average including the current degree of importance $I_{now}$ during previous (n+1) periods.

According to the second method, the image quality control parameter Q is decided to be proportional to an average degree of importance including the current degree of importance $I_{now}$. Formula (2) may be changed to Formula (2') by changing weights of the current degree of importance $I_{now}$ and the average degree of importance $I_{ave}$.

$$Q=Q_{ref} \times (\alpha I_{now}+(1 \times n)/(n+1) \qquad (2')$$

Wherein, 0<α<1.

A third calculation method is a method using a large one of the current degree of importance $I_{now}$ and the average degree of importance $I_{ave}$. In other words, the image quality control parameter calculating unit 14 calculates the image quality control parameter Q by the following Formula (3):

$$Q=Q_{ref} \times \max(I_{now},I_{ave}) \qquad (3)$$

According to the third calculation method, the image quality control parameter Q is decided to be proportional to the large one of the current degree of importance $I_{now}$ and the average degree of importance $I_{ave}$.

A fourth calculation method is a method using only the current degree of importance $I_{now}$. In other words, the image quality control parameter calculating unit 14 calculates the image quality control parameter Q by the following Formula (4):

$$Q=Q_{ref} \times I_{now} \qquad (4)$$

The fourth calculation method does not use the average degree of importance of times corresponding to the previous degree of importance periods but may be combined with any other calculation method. In other words, when the control unit 121 appropriately changes a calculation method from among a plurality of calculation methods, the fourth calculation method may be included as one of the plurality of calculation methods.

A fifth calculation method is a method of comparing the current degree of importance $I_{now}$ with the average degree of importance $I_{ave}$ and uses one of the current degree of importance $I_{now}$ and the average degree of importance $I_{ave}$. In other words, the image quality control parameter calculating unit 14 selects one of the following Formulas (5) to (8) according to a situation representing a result of comparing the current degree of importance $I_{now}$ and the average degree of importance $I_{ave}$ with a degree of importance threshold value $I_{thr}$, and calculates the image quality control parameter Q by the selected formula. A concrete description will proceed below.

(First Situation)

When the average degree of importance $I_{ave}$ is lower than the current degree of importance $I_{now}$ and the current degree of importance $I_{now}$ is higher than the degree of importance threshold value $I_{thr}$ (first situation), the image quality control parameter calculating unit 14 calculates the image quality control parameter Q by the following Formula (5):

$$Q=Q_{ref} \times I_{now} \times c \qquad (5)$$

The degree of importance threshold value $I_{thr}$ is a threshold value used as a degree of importance determination criterion. Here, c is a constant larger than 1.

For example, the first situation means a situation in which the current degree of importance $I_{now}$ is calculated to be high, for example, since a person is detected in a time zone in which the average degree of importance $I_{ave}$ is low since no person is usually detected, and since this situation is an abnormal situation different from a normal situation, the image quality control parameter calculating unit 14 ignores the average degree of importance $I_{ave}$, decides the image quality control parameter based on the current degree of importance $I_{now}$, and calculates the image quality control parameter which is c times (1<c) as high as in the normal situation.

(Second Situation)

When the average degree of importance $I_{ave}$ is lower than the current degree of importance $I_{now}$ and the current degree of importance $I_{now}$ is lower than the degree of importance threshold value $I_{thr}$ (second situation), the image quality control parameter calculating unit 14 calculates the image quality control parameter Q by the following Formula (6):

$$Q=Q_{ref} \times \min(I_{now}, I_{ave}) \qquad (6)$$

The second situation means a situation the current degree of importance $I_{now}$ is calculated to be low as usual in a time zone in which the average degree of importance $I_{ave}$ is low since there is usually nothing, and since this situation is a situation in which there is no abnormality as usual, the image quality control parameter calculating unit 14 employs a lower degree of importance of the average degree of importance $I_{now}$ and the current degree of importance $I_{now}$, and decides the image quality control parameter Q to be proportional to the employed degree of importance.

(Third Situation)

When the average degree of importance $I_{ave}$ is higher than the current degree of importance $I_{now}$ and the current degree of importance $I_{now}$ is higher than the degree of importance threshold value $I_{thr}$ (third situation), the image quality control parameter calculating unit 14 calculates the image quality control parameter Q by the following Formula (7):

$$Q=Q_{ref} \times \max(I_{now}, I_{ave}) \qquad (7)$$

The third situation means a situation in which the current degree of importance $I_{now}$ is calculated to be high since there are many people as usual in a time zone in which the average degree of importance $I_{ave}$ is high since there are usually many people, and since this situation is a situation in which the degree of importance is high as usual, the image quality control parameter calculating unit 14 employs the higher degree of importance of the average degree of importance $I_{ave}$ and the current degree of importance $I_{now}$, and decides the image quality control parameter Q to be proportional to the employed degree of importance.

(Fourth Situation)

When the average degree of importance $I_{ave}$ is higher than the current degree of importance $I_{now}$ and the current degree of importance $I_{now}$ is lower than the degree of importance threshold value $I_{thr}$ (fourth situation), the image quality control parameter calculating unit 14 calculates the image quality control parameter Q by the following Formula (8):

$$Q=Q_{ref} \times I_{ave} \qquad (8)$$

The fourth situation means a situation in which the current degree of importance would be high according to a past history but the current degree of importance is not high, and since this situation is a situation in which detection of the calculation source is likely to be omitted when the current degree of importance is calculated, the image quality control parameter calculating unit 14 ignores the current degree of importance $I_{now}$, and decides the image quality control parameter Q to be proportional to the average degree of importance $I_{ave}$.

Next, a relation between the image quality control parameter and image quality control will be described. The image quality control parameter Q is used to perform control such that as the value of the image quality control parameter Q increases, the image quality of generated video data increases. A plurality of encoded consecutive input images are output from the image encoding unit 122 as the video data, but the image quality of the video data can be adjusted by various methods.

First, the image quality may be adjusted according to a frame rate (the number of frames of a video signal to be output per second) in the imaging unit 111. As the frame rate increases, a smooth video is obtained, and the image quality of the video data is improved. Further, the image quality may be adjusted by adjusting the resolution of each frame in the signal processing unit 112 (by thinning out a video signal of a frame at a certain rate).

Further, the image quality may be adjusted by adjusting a compression rate in compression coding by the image encoding unit 122. Specifically, the image quality may be adjusted by adjusting a quantization parameter. Further, the image quality may be adjusted by switching the necessity of encoding in the image encoding unit 122.

As described above, the image quality may be adjusted by the imaging unit 111, the signal processing unit 112, and the image encoding unit 122. The photographing system 100 may adjust the image quality by one of the above-mentioned configurations, may adjust the image quality in each of the plurality of configurations, or may switch an appropriate configuration for adjusting the image quality based on the relation between the average degree of importance and the current degree of importance.

The image quality control parameter calculating unit 14 generates the image quality control parameter according to the configuration of adjusting the image quality. For example, when the image quality is adjusted by adjusting the frame rate in the imaging unit 111, the image quality control parameter calculating unit 14 calculates the frame rate to be set by the imaging unit 111 as the image quality control parameter Q, and outputs the calculated frame rate to the imaging unit 111. When the image quality is adjusted by adjusting the resolution in the signal processing unit 112, the image quality control parameter calculating unit 14 calculates the resolution to be set by the signal processing unit 112 as the image quality control parameter Q, and outputs the calculated resolution to the signal processing unit 112.

Further, when the image quality is adjusted by adjusting the quantization parameter in the image encoding unit 122, the image quality control parameter calculating unit 14 calculates the quantization parameter to be set by the image encoding unit 122 as the image quality control parameter Q, and outputs the calculated quantization parameter to the image encoding unit 122. When the image quality is adjusted according to the necessity of encoding in the image encoding unit 122, the image quality control parameter calculating unit 14 outputs a parameter representing the necessity of encoding to the image encoding unit 122 as the image quality control parameter Q.

When the image quality control parameter calculating unit 14 designates a frame rate as the image quality control parameter Q, the imaging unit 111 performs imaging by the imaging element according to the frame rate. When the image quality control parameter calculating unit 14 designates a resolution as the image quality control parameter Q, the signal processing unit 112 performs signal processing on an input video signal according to the resolution. When the image quality control parameter calculating unit 14 designates a quantization parameter as the image quality control parameter, the image encoding unit 122 performs quantization according to the quantization parameter. When the image quality control parameter calculating unit 14 designates the suspension of encoding as the image quality control parameter Q, the image encoding unit 122 suspends encoding, and outputs the input image as the video data without change.

The video data output from the image encoding unit 122 is transmitted to the recording device 200 via the network NW and then recorded in the recording device 200.

Figure 9:
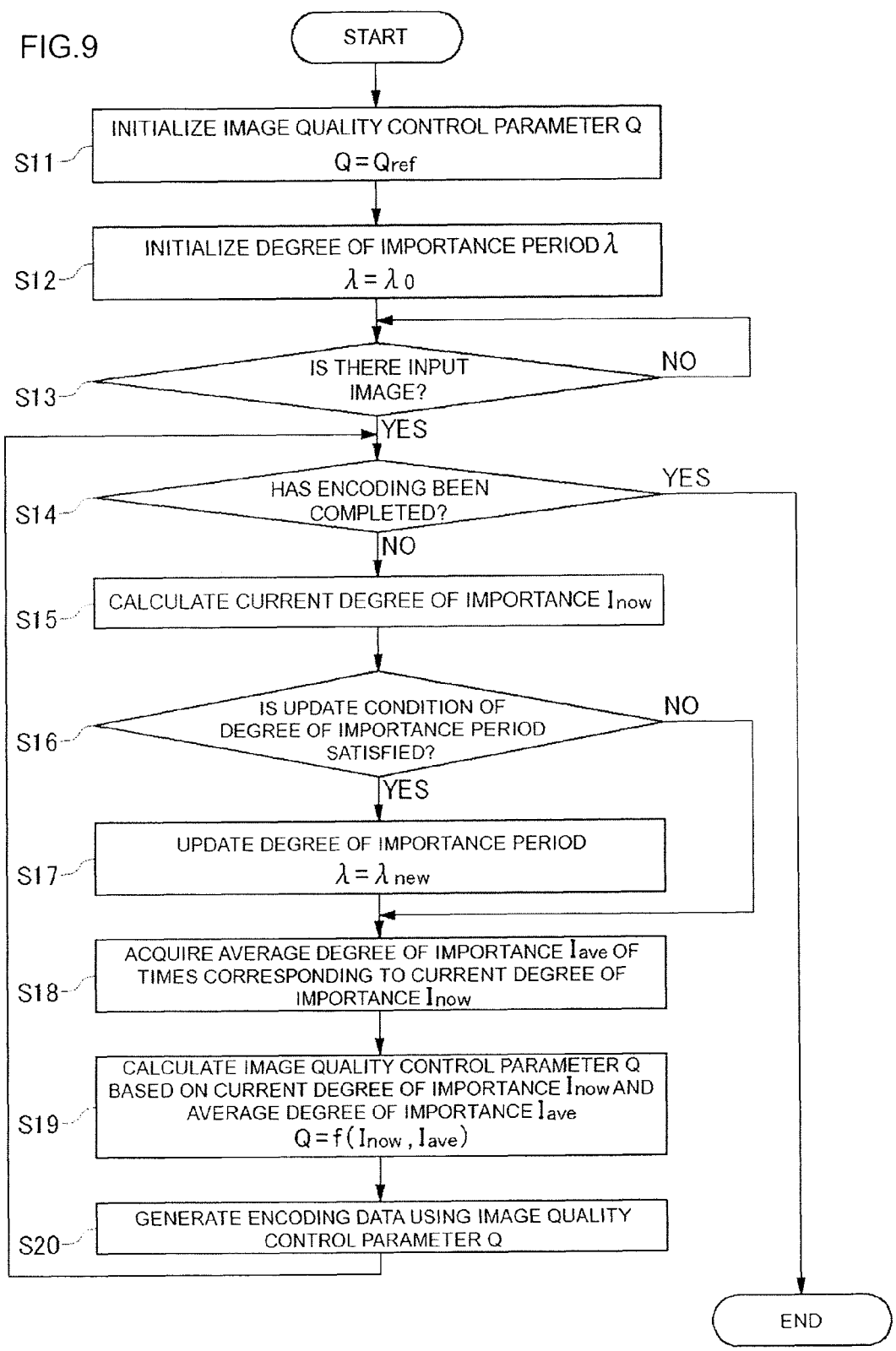
FIG. 9 is a flowchart illustrating an image encoding method according to the first embodiment of the present technology.

FIG. 9 is a flowchart illustrating an image encoding method according to an embodiment of the present technology. The image encoding method is performed by the control unit of the image encoding device 120. First, the image quality control parameter calculating unit 14 initializes the image quality control parameter Q to $Q_{ref}$ (step S11). Further, the average degree of importance calculating unit 13 initializes the degree of importance period $\lambda$ to $\lambda_0$ (step S12I).

Then, it is determined whether there is an input image input from the signal processing unit 112 (step S13). When no input image is input (NO in step S13), it is on standby until an input image is input. When the input image is determined to be input, it is determined whether encoding is completed (step S14), and when encoding is determined to be completed (YES in step S14), the process ends. When encoding is determined not to be incomplete (NO in step S14), the following process is performed.

First, the degree of importance calculating unit 11 receives an input image of one frame from the signal processing unit 112, calculates the degree of importance of the frame, that is, the current degree of importance $I_{now}$ of the frame, and inputs the calculated current degree of importance $I_{now}$ to the degree of importance period calculating unit 12, the average degree of importance calculating unit 13, and the image quality control parameter calculating unit 14 (step S15). Then, the degree of importance period calculating unit 12 stores the degree of importance input from the degree of importance calculating unit 11 in step S15, and determines whether a condition of updating the degree of importance period is satisfied (step S16). For example, this condition can be appropriately set such as what a certain period of time elapses after a previous update, what a certain time comes, or that processing of one GOP ends.

When the condition of updating the degree of importance period is determined to be satisfied (YES in step S16), the degree of importance period calculating unit 12 calculates the degree of importance period $\lambda_{new}$, and outputs the calculation result to the average degree of importance calculating unit 13, and the average degree of importance calculating unit 13 updates the existing degree of importance period to $\lambda_{new}$ (step S17).

After the degree of importance period is updated, when an update timing of the degree of importance period is determined not to come (NO in step S16), step S17 is skipped, and the average degree of importance calculating unit 13 obtains the previous average degree of importance $I_{ave}$ of a time in a period of an input frame using degrees of importance of a plurality of previous periods corresponding to a time in a period of a frame through which the degree of importance is input from the degree of importance calculating unit 11 (step S18).

The image quality control parameter calculating unit 14 calculates the image quality control parameter Q based on the current degree of importance $I_{now}$ input from the degree of importance calculating unit 11 and the average degree of importance $I_{ave}$ input from the average degree of importance calculating unit 13, outputs the image quality control parameter Q to a relevant configuration, and sets the image quality control parameter Q (step S19). The photographing system 100 performs processing such as photographing, signal processing, and encoding according to the set image quality control parameter Q, and generate video data (step S20). Thereafter, the process returns to step S14, and it is determined whether encoding on all input frames has ended, and the process of steps S14 to S20 is repeated unless the video signal is continuously input.

As described above, according to the photographing recording system 1000 of the present embodiment, it is possible to adjust the image quality according to an actual degree of importance of a frame. Further, instead of simply controlling the image quality based on a degree of importance of a current frame, a degree of importance period is calculated based on a degree of importance of a previous frame, and the image quality is adjusted while considering a degree of importance of a corresponding time of a previous period together, and thus it is possible to more appropriately control the image quality.

Second Embodiment

In the first embodiment, as the video data is generated at the image quality according to the degree of importance, it is possible to effective use the memory capacity when the video data is recorded in the recording device 200. Further, it is convenient if it is possible to designate a timing at which the video data is recorded to fill up the memory capacity of the recording medium of the recording device 200 so that there is no free space in the recording medium. This is because at this timing, it is possible to copy the video data recorded in the recording medium of the recording device 200 to another recording medium and secure a free space or replace with a new recording medium.

However, when the image encoding device 120 encodes the input image while controlling the image quality according to the degree of importance, a generated coding amount changes according to the content of the input image and the image quality, and it is difficult to predict a period of time in which there is no free space in the recording medium. Thus, in order to prevent a situation in which it is difficult to record since there is no free space in the recording medium of the recording device 200, it is necessary to monitor the free space of the recording medium of the recording device 200. In this regard, in the present embodiment, an image encoding device capable of controlling the image quality according to the degree of importance and designating a period of time (the number of days) of a video to be recorded in the recording medium of the recording device 200 is provided. To this end, the image encoding device according to the present embodiment sets a reference value $Q_{ref}$ (hereinafter, referred to as a "reference image quality control parameter") of the image quality control parameter according to a desired recording period of time.

Figure 10:
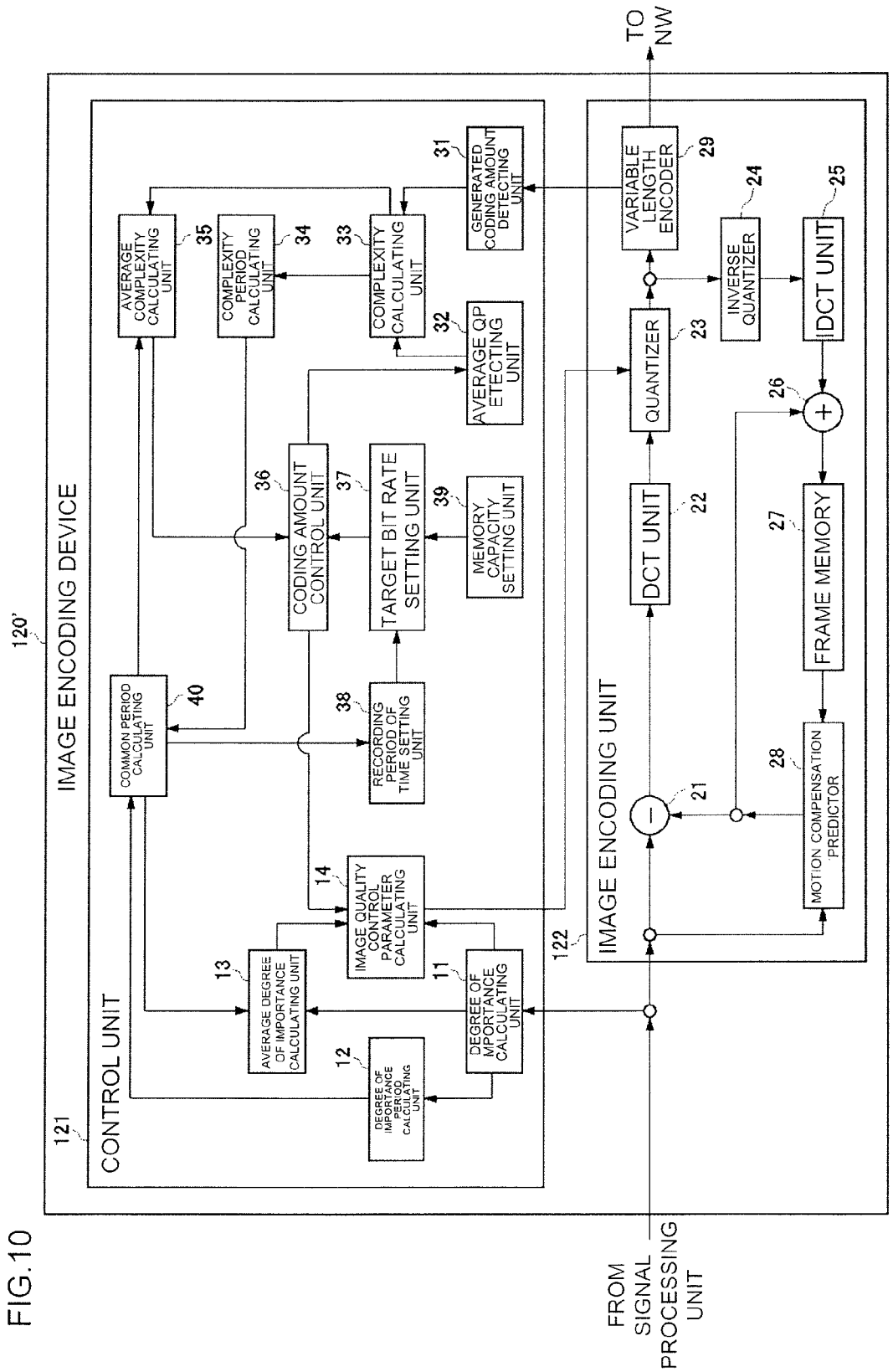
FIG. 10 is a block diagram illustrating a configuration of an image encoding device according to a second embodiment of the present technology.

FIG. 10 is a block diagram illustrating a configuration of an image encoding device according to the second embodiment. Compared with the image encoding device 120 according to the first embodiment, an image encoding device 120 according to the present embodiment includes a generated coding amount detecting unit 31, an average QP detecting unit 32, a complexity calculating unit 33, a complexity period calculating unit 34, an average complexity calculating unit 35, a coding amount control unit 36, a target bit rate setting unit 37, a recording period of time setting unit 38, a memory capacity setting unit 39, and a common period calculating unit 40 in addition to the configuration of the image encoding device 120 according to the first embodiment. The configuration of the image encoding unit 122 is the same as in the first embodiment, and a detailed configuration thereof is illustrated in FIG. 10. The remaining configuration is the same as the configuration according to the first embodiment, and denoted by the same reference numerals, and a description thereof will be appropriately omitted. The present embodiment will be described in connection with an example in which the image quality control parameter Q is the quantization parameter.

The image encoding unit 122 includes a subtractor 21, a discrete cosine transform (DCT) unit 22, a quantizer 23, an inverse quantizer 24, an inverse discrete cosine trans form (IDCT) unit 25, an adder 26, a frame memory 27, a motion compensation predictor 28, and a variable length encoder 29.

The video signals of consecutive frames photographed by the camera 110 are input to the image encoding unit 122 as the input image. In the image encoding unit 122, the input image is classified into an I picture on which intra-frame coding is performed, a P picture on which inter-frame prediction coding is performed by forward prediction, and a B picture on which inter-frame prediction coding of both forward and backward directions is performed. In the image encoding unit 122, the input image is divided into macroblocks of 16×16 pixels, an encoding process is performed in units of macroblocks.

The input image of the I picture input to the subtractor 21 is input to the DCT unit 22 without change. The DCT unit 22 performs the DCT on the input image, generates a DCT coefficient, and outputs the DCT coefficient to the quantizer 23. The quantizer 23 quantizes the input DCT coefficient by a quantization parameter (a quantization level) designated by the coding amount control unit 36 which will be described later, generates a quantization transform coefficient, and outputs the quantization transform coefficient to the inverse quantizer 24 and the variable length encoder 29. The variable length encoder 29 encodes the input quantization transform coefficient, and generates and outputs encoding data of the I picture.

The inverse quantizer 24 inversely quantizes the input quantization transform coefficient, generates an inverse quantization transform coefficient, and outputs the inverse quantization transform coefficient to the IDCT unit 25. The IDCT unit 25 performs IDCT on the input inverse quantization transform coefficient and reconstructs the input image. The reconstructed input image is recorded in the frame memory 27 to be used as a reference image in subsequent inter-frame prediction.

The input images of the P picture and the B picture are input to the motion compensation predictor 28. The motion compensation predictor 28 compares the input image with the reference image recorded in the frame memory 27, and calculates a motion vector for each macroblock. The motion compensation predictor 28 further performs motion compensation frame prediction based on the calculated motion vector, and generate a predictive image on the input image. The predictive image generated by the motion compensation predictor 28 is output to the subtractor 21 and the adder 26.

The subtractor 21 calculates a difference image between the input image and the predictive image, and outputs the difference image to the DCT unit 22. The DCT unit 22 performs the DCT on the difference image, calculates a DCT coefficient, and outputs the DCT coefficient to the quantizer 23. The quantizer 23 quantizes the input DCT coefficient by a quantization parameter designated by the coding amount control unit 36, generates a quantization transform coefficient, and outputs the quantization transform coefficient to the inverse quantizer 24 and the variable length encoder 29. The variable length encoder 29 encodes the input quantization transform coefficient, and generates and outputs encoding data of the P picture or the B picture.

The inverse quantizer 24 inversely quantizes the input quantization transform coefficient, generates an inverse quantization transform coefficient, and outputs the inverse quantization transform coefficient to the IDCT unit 25. The IDCT unit 25 performs IDCT on the input inverse quantization transform coefficient, reconstructs the difference image, and outputs the difference image to the adder 26. The adder 26 reconstructs the input image by adding the input difference image to the predictive image previously output from the motion compensation predictor 28. The reconstructed input image is recorded in the frame memory 27 as the reference image.

Then, the same process is repeated, and thus encoding data of the I picture, the P picture, and the B picture is output from the variable length encoder 29 in a certain order as a bitstream. The bitstream output from the variable length encoder 29 is output to the recording device 200.

As described above, the quantization parameter in the quantizer 23 is variable, and as the quantization parameter increases, the coding amount of the encoding data generated by the variable length encoder 29 decreases, whereas when the quantization parameter in the quantizer 23 decreases, the coding amount of the encoding data generated by the variable length encoder 29 increases. Further, even when the quantization parameter is fixed, as the spatial frequency of the video signal increases or as motion of a subject in consecutive frames is more active, the coding amount of the encoding data to be generated increases.

Next, the control unit 121 will be described. The average QP detecting unit 32 receives the reference image quality control parameter $Q_{ref}$ (quantization parameter) (which will be described later) calculated by the coding amount control unit 36, calculates an average (an average quantization parameter) of the quantization parameters corresponding to one GOP, and outputs the average quantization parameter to the complexity calculating unit 33. Further, the encoding data generate by the variable length encoder 29 is output to the generated coding amount detecting unit 31. The generated coding amount detecting unit 31 accumulates the generated coding amount of one GOP, calculates a bit rate of one GOP, and outputs the bit rate to the complexity calculating unit 33.

Here, a GOP means a set of two or more frames including an I picture of at least one frame. When a GOP includes an I picture of one frame, the GOP serves as a minimum unit structure configuring a playable moving image. The generated coding amount detecting unit 31 calculates the bit rate by dividing a total coding amount of a plurality of encoding data corresponding to one GOP by a period of time of one GOP.

The complexity calculating unit 33 calculates image complexity based on the average quantization parameter input from the average QP detecting unit 32 and the bit rate input from the generated coding amount detecting unit 31. The mage complexity (Fim) is a value which is obtained by applying the input average quantization parameter ($QP_{AVG}$) and the bit rate (Br) to a certain transform function $f_1$ and represents difficulty of encoding or complexity of an image, and calculated by the following Formula (9):

$$Fim = f_1(QP_{AVG}, Br) \qquad (9)$$

Here, the transform function $f_1$ is selected so that the image complexity (Fim) simply increases as each of the average quantization parameter ($QP_{AVG}$) and the bit rate (Br) increases. The calculated image complexity is output to the complexity period calculating unit 34 and the average complexity calculating unit 35.

The complexity period calculating unit 34 records the image complexity of each GOP input from the complexity calculating unit 33, performs periodic analysis on the record, and calculates a complexity period. The complexity period calculating unit 34 according to the present embodiment employs the Fourier transform for the periodic analysis, but may perform another periodic analysis such as analysis using an auto-correlation function. The complexity period calculating unit 34 regularly calculates the complexity period at a set period (for example, once a day) or the latest complexity period calculated by the complexity period calculating unit 34. Further, the complexity period calculating unit 34 calculates the complexity period according to an external trigger input (for example, an instruction from a user) regardless of whether a timing at which the complexity period is calculated comes. For example, when an operating period of time of one day is changed, the user gives an instruction for calculating the complexity period.

The complexity period calculating unit 34 calculates the complexity period by performing the Fourier transform on the image complexity corresponding to last one week (7 days). Further, even when no image is consecutively input during one week, for example, even when images are input (the image encoding device is operated) only for 8 hours every day, the complexity period calculating unit 34 performs the periodic analysis on the image complexity corresponding to last one week (8 hours×7 days) to calculate the complexity period.

The complexity period calculated by the complexity period calculating unit 34 is output to the common period calculating unit 40. Further, the degree of importance period calculated by the degree of importance period calculating unit 12 is output to the common period calculating unit 40 as well. The common period calculating unit 40 calculates a period corresponding to the lowest common multiple of the input complexity period and the degree of importance period as a common period, and set the calculated common period to the average complexity calculating unit 35 and the average degree of importance calculating unit 13. In this case, the average complexity calculating unit 35 and the average degree of importance calculating unit 13 use the same period.

Further, when the complexity period calculated by the complexity period calculating unit 34 is identical to the degree of importance period calculated by the degree of importance period calculating unit 12, naturally, the periods are not changed in the common period calculating unit 40 and set to the average complexity calculating unit 35 and the average degree of importance calculating unit 13 as the common period without change. Further, when the degree of importance calculating unit 11 uses the image complexity as the degree of importance, since the complexity period is identical to the degree of importance period, the common period calculating unit 40 is unnecessary.

The average complexity calculating unit 35 calculates an average (an average image complexity $Fim_{AVG}$) of the image complexity corresponding to one common period based on the common period set by the common period calculating unit 40, and outputs the average image complexity $Fim_{AVG}$ to the coding amount control unit 36. The average complexity calculating unit 35 calculates the average image complexity in the latest one common period using the image complexity corresponding to one common period before the GOP of the image complexity for each GOP. The average complexity calculating unit 35 may calculate the average image complexity at intervals of the common period set by the common period calculating unit 40 or may calculate the average image complexity each time the image complexity is input from the complexity calculating unit 33. When the average image complexity is calculated, the average complexity calculating unit 35 outputs the average image complexity to the coding amount control unit 36.

The recording period of time setting unit 38 calculates a recording period of time based on an operating period of time of one day and the desired number of recording days. The desired number of recording days is set by the user as the number of days in which recording is desired to be performed in the recording medium of the recording device 200. The common period calculated by the common period calculating unit 40 is used as the operating period of time of one day. The operating period of time of one day may be set to the recording period of time setting unit 38 by the user. The recording period of time setting unit calculates the recording period of time by multiplying the operating period of time of one day by the desired number of recording days. For example, when the operating period of time of one day (complexity period) is 8 hours and video data is desired to be recorded in the recording medium for 30 days, the recording period of time set by the recording period of time setting unit 38 is 240 hours (=8 hours×30 days). The recording period of time setting unit 38 outputs the calculated recording period of time to the target bit rate setting unit 37.

The memory capacity of the recording medium of the recording device 200 is set to the memory capacity setting unit 39 by the user. The memory capacity setting unit 39 may acquire memory capacity information of the recording medium from the recording device 200. The memory capacity setting unit 39 outputs the memory capacity information to the target bit rate setting unit 37.

The target bit rate setting unit 37 sets a target bit rate based on the memory capacity of the recording medium of the recording device 200 acquired from the memory capacity setting unit 39 and the recording period of time acquired from the recording period of time setting unit 38. When the memory capacity of the recording medium of the recording device 200 is 480 GB and the recording period of time is 240 hours, a total generated coding amount per hour is about 2 GB/h (=480 GB/240 hours). In other words, in this case, an average bit rate is about 4.55 Mbps (=2 GB×8×1024/60 minutes/60 seconds). In this case, 4.55 Mbps is set to the target bit rate setting unit 37 as the target bit rate.

The coding amount control unit 36 decides the reference image quality control parameter $Q_{ref}$ based on the average image complexity acquired from the average complexity calculating unit 35 and the target bit rate acquired from the target bit rate setting unit 37. Specifically, the coding amount control unit 36 decides the reference image quality control parameter $Q_{ref}$ by the following Formula (10):

$$Q_{ref} = f_2(Fim_{AVG}, TgtBr) \quad (10)$$

Wherein, $Fim_{AVG}$ represents to the average image complexity, and TgtBr represents the target bit rate, and $f_2$ is a function of deciding the reference image quality control parameter $Q_{ref}$ necessary to achieve the target bit rate based on the average image complexity. In the present embodiment, since the image quality control parameter Q is the quantization parameter, the reference image quality control parameter $Q_{ref}$ is a quantization parameter used as a reference.

The coding amount control unit 36 outputs the calculated reference image quality control parameter $Q_{ref}$ to the image quality control parameter calculating unit 14 and the average QP detecting unit 32. The image quality control parameter calculating unit 14 decides the image quality control parameter Q using the reference image quality control parameter $Q_{ref}$ calculated by the coding amount control unit 36, similarly to the first embodiment. The average QP detecting unit 32 calculates the average quantization parameter using the reference image quality control parameter $Q_{ref}$ which is the quantization parameter as described above.

Figure 11:
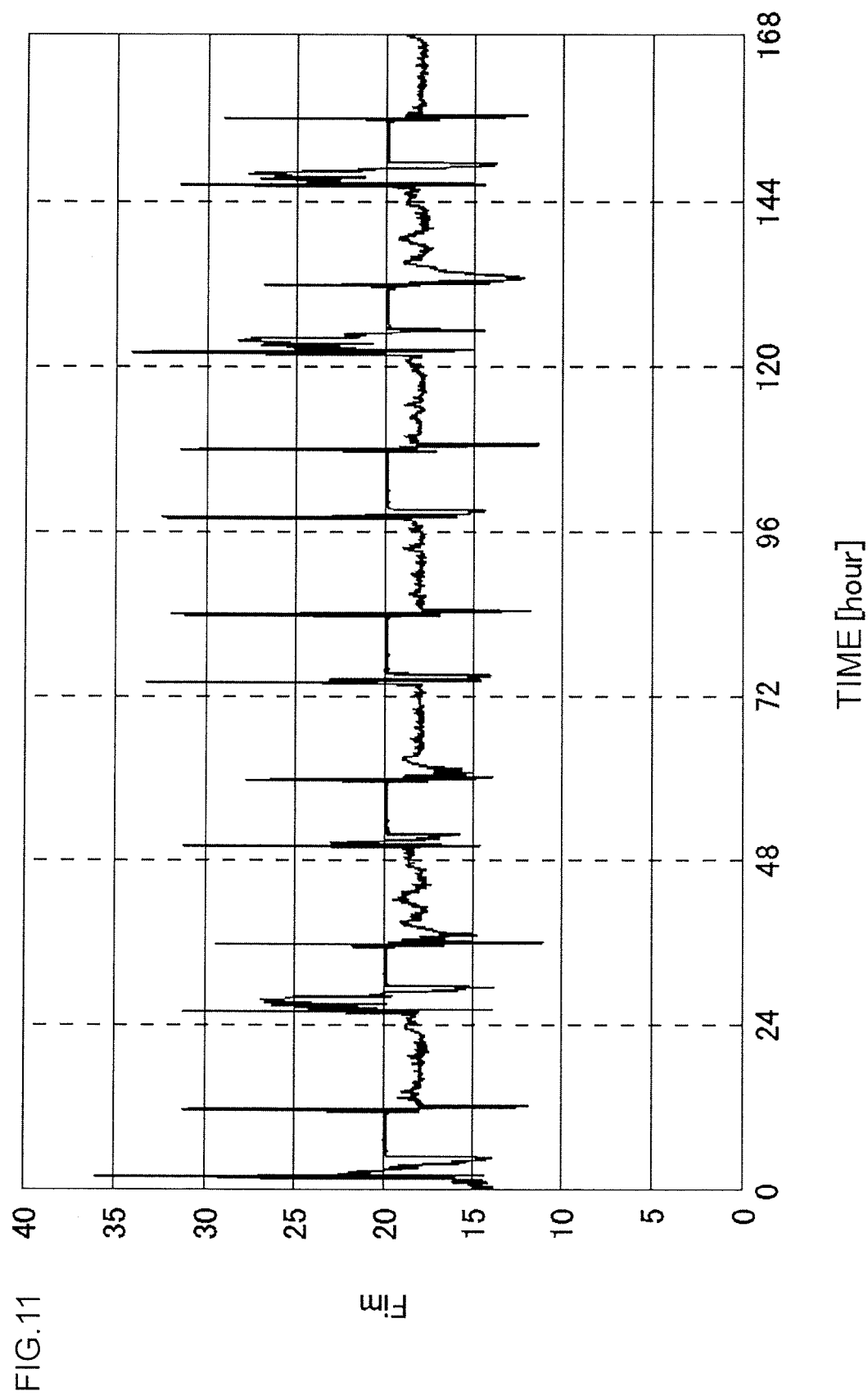
FIG. 11 is a graph illustrating an example of a change in image complexity of one GOP according to the second embodiment of the present technology.

As described above, the reason of calculating an average in one common period which is an integer multiple of the complexity period through the average complexity calculating unit 35 is as follows. FIG. 11 is a graph illustrating an example of a change in the image complexity of one GOP. In the example of FIG. 11, the image complexity in one week (7 days) is recorded using one GOP as one second. When a motion amount of a subject changes according to a time zone, the image complexity may vary as illustrated in FIG. 11.

For example, when the camera 110 is installed in a store and used as a monitoring camera, the complexity of the input image changes such that in the daytime, since the number of visitors is large, and motion of a subjects is active, the input image is complicated, and in the middle of the night, the number of visitors is small, and the input image is a monotonous image similarly to a still image. As described above, for example, the complexity of the input image largely changes between day and night, but when this change is periodical, a total generated coding amount in an arbitrary complexity period is nearly constant, that is, an average bit rate is nearly constant when an average is obtained in an arbitrary complexity period, and it is possible to decide how many days (how many periods) for which video can be recorded in the recording device 200.

Figure 12:
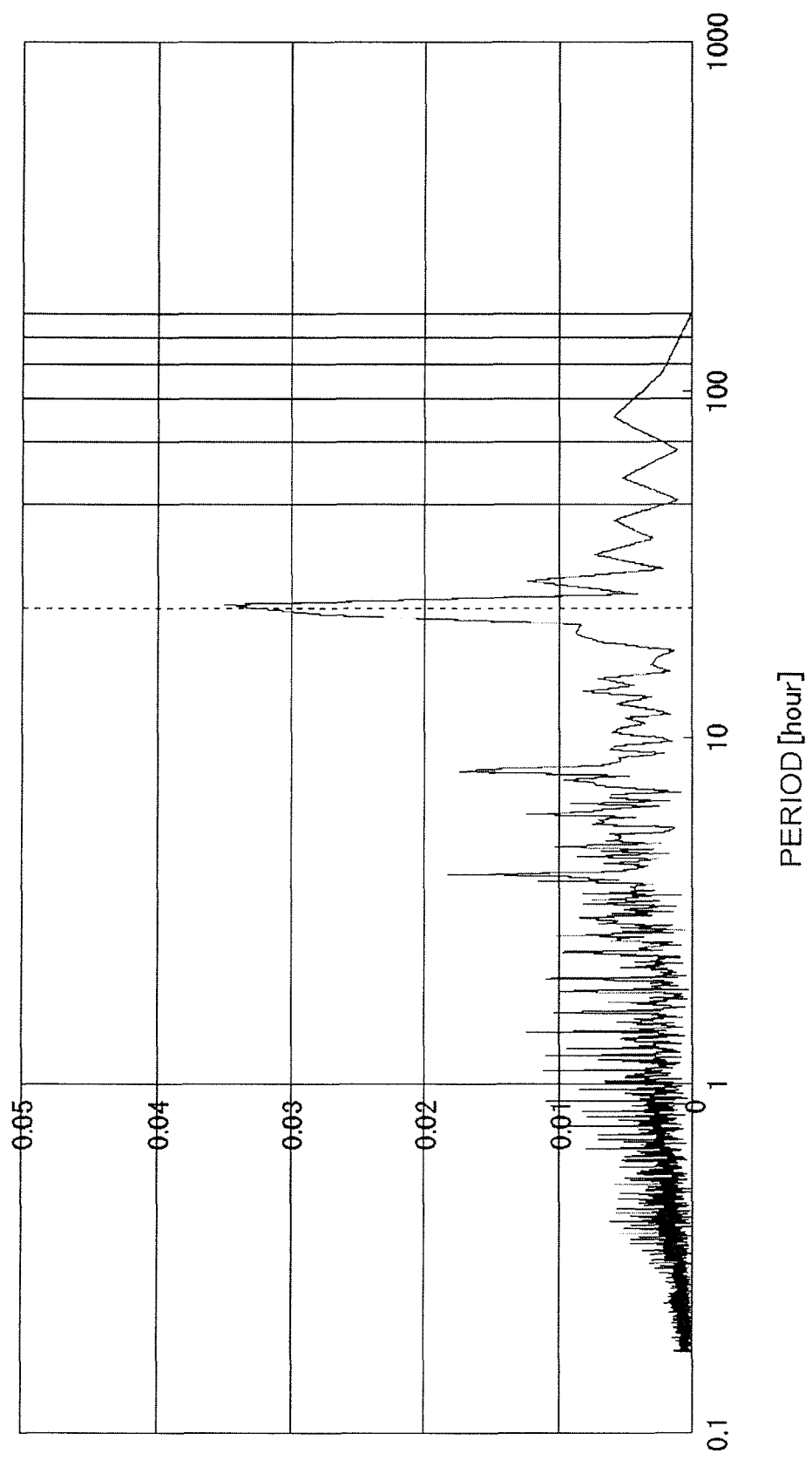
FIG. 12 is a graph illustrating a frequency spectrum obtained by performing Fourier transform on image complexity according to the second embodiment of the present technology.

FIG. 12 is a graph illustrating a frequency spectrum obtained by performing the Fourier transform on the image complexity of FIG. 11. The complexity period calculating unit 34 obtains the frequency spectrum of FIG. 12 by performing the Fourier transform on the image complexity. The complexity period calculating unit 34 uses the period having the highest peak as the complexity period of the image complexity based on the frequency spectrum. In the example of FIG. 12, the highest peak appears in 24 hours. Thus, 24 hours is calculated as the complexity period of the image complexity of FIG. 11.

As described above, a period actually used to decide the reference image quality control parameter $Q_{ref}$ is a common period which is an integer multiple of the complexity period. For this reason, when an average is obtained in one period, the average bit rate is nearly constant even in the common period. Further, in the common period, the image quality control parameter Q changes according to the degree of importance period, and thus the generated coding amount also changes, but an average is obtained in a degree of importance period, the average bit rate is nearly constant, and when an average is obtained in a common period which is an integer multiple of a degree of importance period, the average bit rate is nearly constant. Thus, using the average bit rate in the common period, it is possible to obtain the reference image quality control parameter $Q_{ref}$ used to record a video corresponding to a desired number of days (a desired number of periods) in the recording device 200.

The coding amount control unit 36 does not obtain the reference image quality control parameter $Q_{ref}$ so that the bit rate of one GOP is used as the target bit rate but sets the reference image quality control parameter $Q_{ref}$ so that the average bit rate in the common period calculated by the common period calculating unit 40 is used as the target bit rate. In other words, within one common period, the coding amount control unit 36 allows the bit rate to increase when the input image is complicated and allows the bit rate to decrease when the input image is monotonous, and sets the reference image quality control parameter $Q_{ref}$ so that a total generated coding amount in one common period or the average bit rate in one common period has a target value. Thus, the coding amount control unit 36 decides the reference image quality control parameter $Q_{ref}$ from the relation between the average image complexity and the target bit rate in the common period obtained by the common period calculating unit 40 instead of the relation between the image complexity of each GOP obtained by the complexity calculating unit 33 and the target bit rate.

Figure 13:
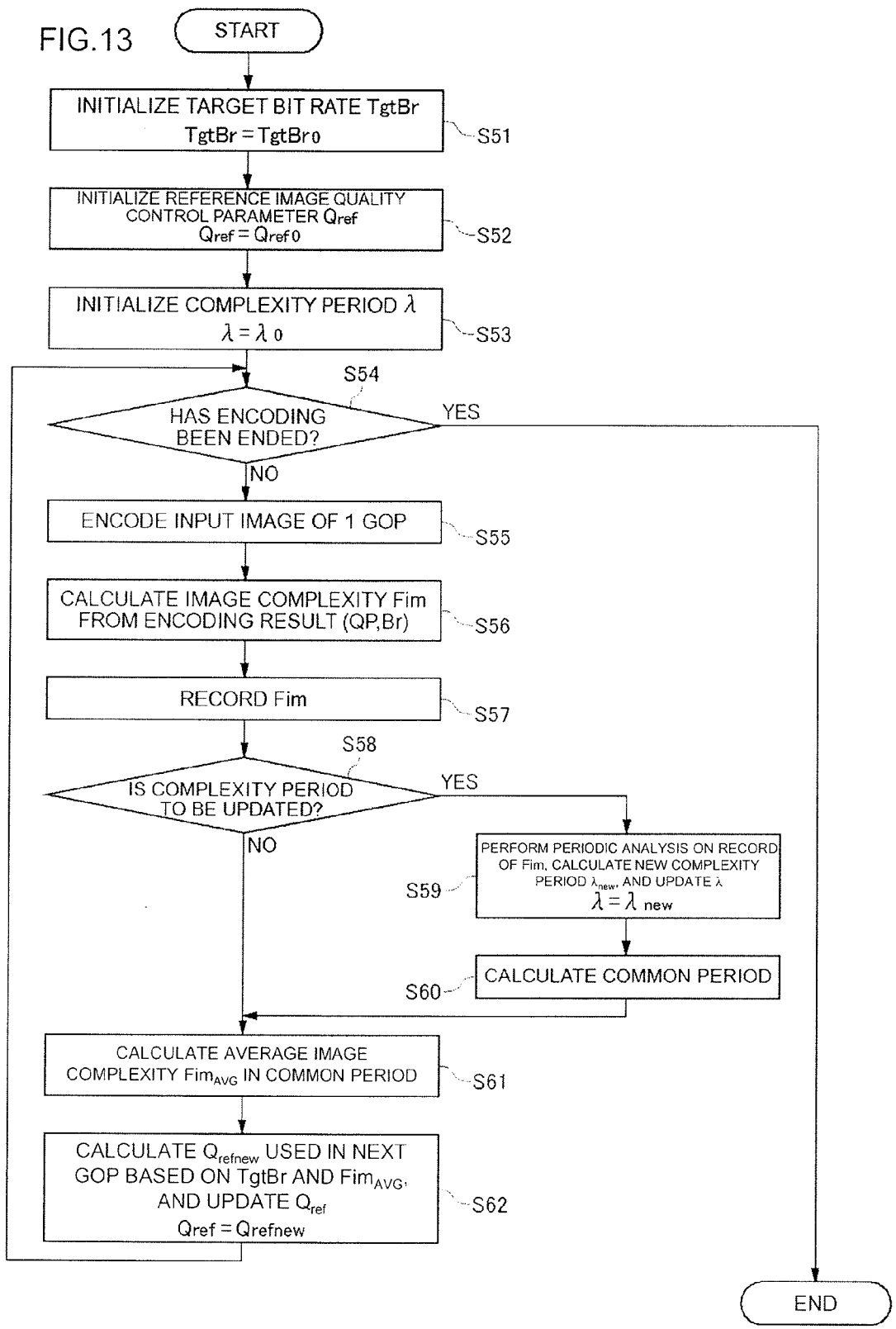
FIG. 13 is a flowchart illustrating an operation of an image encoding device according to the second embodiment of the present technology.
Figure 14:
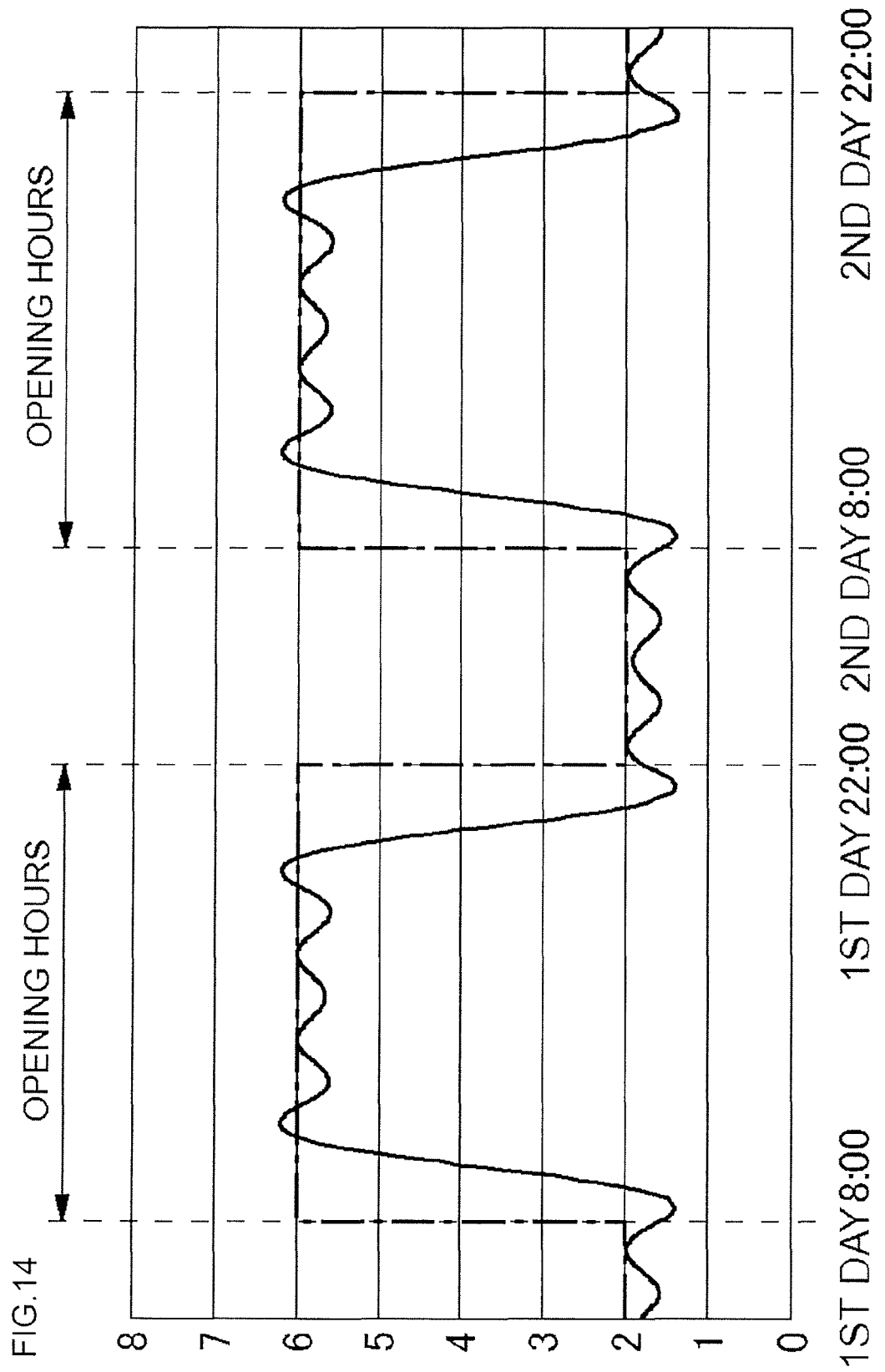
FIG. 14 is a graph illustrating an example of a change in a degree of importance when a monitoring camera is installed in a retail store.
Figure 15:
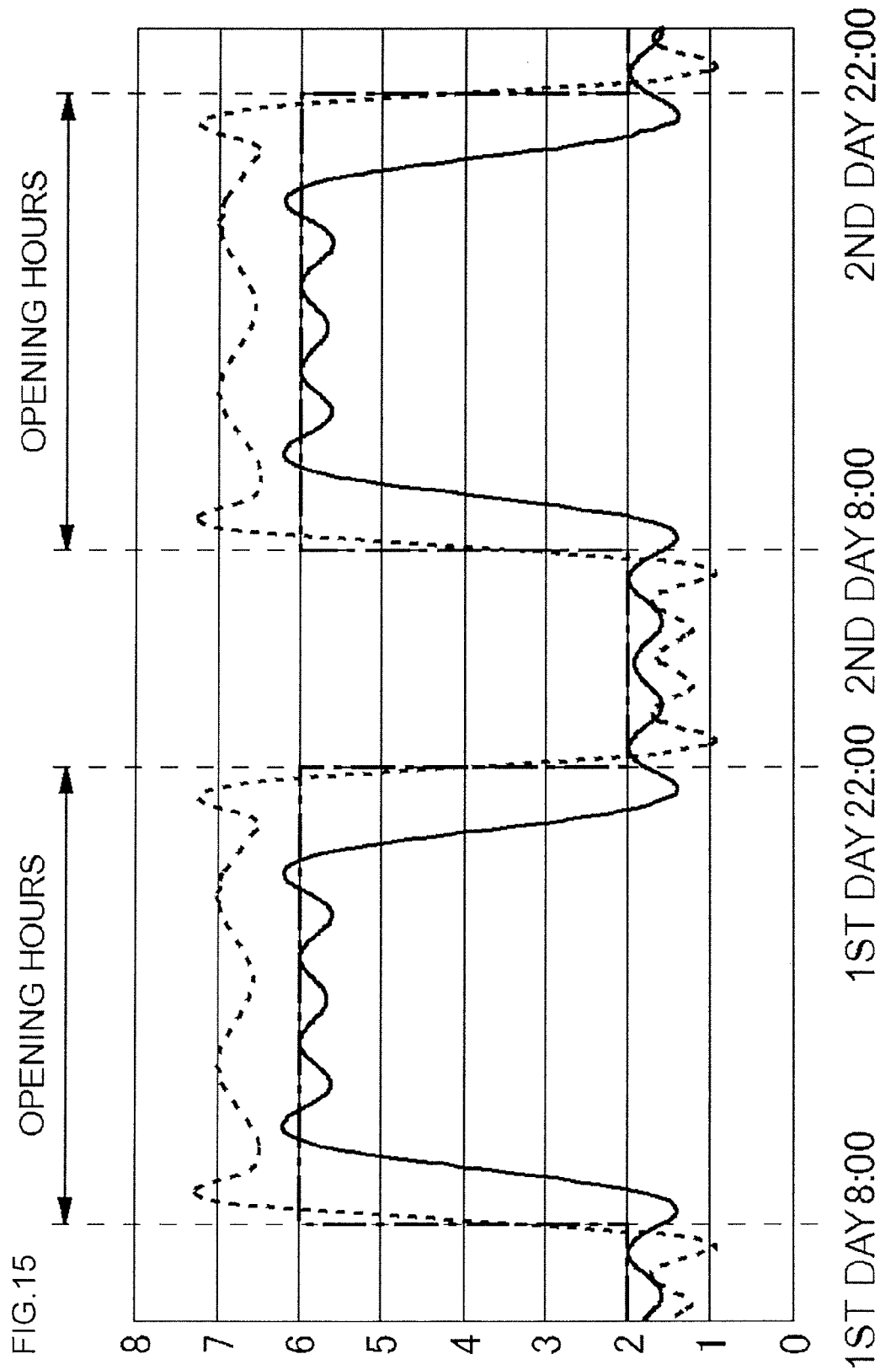
FIG. 15 is a graph illustrating an example of a change in a degree of importance when a monitoring camera is installed in a retail store.

FIG. 13 is a flowchart illustrating an operation of the image encoding device 120' according to the present embodiment. FIG. 13 illustrates an operation mainly performed by the configuration added to the image encoding device 120 according to the first embodiment in the present embodiment. The operation of each configuration described in the first embodiment is performed in parallel with the flow of FIG. 13.

When the image encoding process starts, first, the target bit rate TgtBr is initialized, that is, TgtBr=$TgtBr_0$ (step S51). Further, the reference image quality control parameter $Q_{ref}$ is initialized, that is, $Q_{ref}=Q_{ref0}$ (step S52). Further, the complexity period λ, is also initialized, that is, λ=$λ_0$ (step S53).

Then, it is determined whether encoding has ended (step S54). When it is determined that encoding has not ended, that is, when a frame image is still being input (NO in step S54), the image encoding unit 122 encodes an input image of one GOP (step S55). Then, the complexity calculating unit 33 calculates the image complexity Fim based on the encoding result in step S55, that is, the average QP and the bit rate Br as in Formula (1) (step S56), and the complexity period calculating unit 34 and the average complexity calculating unit 35 records the image complexity Fim (step S57).

The complexity period calculating unit 34 determines whether the complexity period is to be updated (step S58). When there is an external trigger or when a timing at which the complexity period is updated comes as described above, the complexity period calculating unit 34 determines that the complexity period is to be updated. When the complexity period is determined to be updated (YES in step S58), the complexity period calculating unit 34 performs the periodic analysis on the record of the image complexity Fim corresponding to last one week, calculates the complexity period $λ_{new}$, and outputs the complexity period $λ_{new}$ to the common period calculating unit 40 as λ=$_{new}$ (step S59).

When the new complexity period $λ_{new}$ is input, the common period calculating unit 40 calculates the common period which is the lowest common multiple of the new complexity period $λ_{new}$ and the degree of importance period using the new complexity period $λ_{new}$ and the degree of importance period, and outputs the calculated common period to the average complexity calculating unit 35 and the average degree of importance calculating unit 13 (step S60).

Further, the common period calculating unit 40 updates the common period even when the new degree of importance period is input from the degree of importance period calculating unit 12.

When there is no external trigger for calculating the complexity period or when a timing at which the complexity period is updated does not come yet (NO in step S58), or after the common period is updated in step S60, the average complexity calculating unit 35 calculates the average image complexity $\text{Fim}_{AVG}$ in the common period (step S61). Then, the coding amount control unit 36 calculates the reference image quality control parameter $Q_{refnew}$ to be used in a next GOP based on the target bit rate (TgtBr) and the average image complexity $\text{Fim}_{AVG}$, and updates the reference image quality control parameter $Q_{ref}$ as $Q_{ref}=Q_{refnew}$ (step S62). Then, the process returns to step S54, and it is determined whether encoding has ended, that is, whether there is still an input image to be encoded. When there is no input image to be encoded and thus encoding has ended (NO in step S54), the process ends.

As described above, in the image encoding device 120 according to the present embodiment, the quantization parameter is controlled so that the average bit rate in the common period which is an integer multiple of the complexity period of the input image is the target bit rate, and thus even when the subject changes within one common period or even when the image quality changes according to the degree of importance, the generated coding amount in one common period is fixed to a certain value.

Further, in the second embodiment, the common period calculating unit 40 calculates the period of the lowest common multiple of the input complexity period and the degree of importance period as the common period and sets the calculated common period to the average degree of importance calculating unit 13 as well as the average complexity calculating unit 35, and the average degree of importance calculating unit 13 calculates the average degree of importance using the common period, but the average degree of importance calculating unit 13 may use the degree of importance period calculated by the degree of importance period calculating unit 12 without change. In other words, only the average complexity calculating unit 35 may use the common period which is the lowest common multiple of the complexity period and the degree of importance period.

Further, in the second embodiment, the control unit 121 includes the common period calculating unit 40 that calculates the period of the lowest common multiple of the complexity period and the degree of importance period as the common period, but the control unit 121 may not include the common period calculating unit 40. In this case, the complexity calculated by the complexity calculating unit 33 is influenced by the image quality adjustment according to the degree of importance, but the generated coding amount in the complexity period calculated by the complexity period calculating unit 34 is constant, and thus the above object can be achieved. Further, in this case, when the complexity period calculating unit 34 performs the periodic analysis and decides a period having the highest peak as the complexity period without exception, if the complexity period is extremely long, a period having the smallest peak equal to or higher than a certain threshold value may be decided as the complexity period.

Further, the second embodiment has been described in connection with the example in which the image quality control parameter is the quantization parameter, but the second embodiment can be applied even when the image quality control parameter is another parameter such as a frame rate in the imaging unit 111. In other words, when the image complexity is calculated based on the actual generated coding amount, the complexity period is calculated, the lowest common multiple of the degree of importance period and the complexity period is decided as the common period, and the reference image quality control parameter is set so that the average bit rate in the common period is a desired bit rate, it is possible to record video data of a desired period of time in the recording device 200 having a certain memory capacity.

Further, the first and second embodiments have been described in connection with the example in which the camera 110 is the monitoring camera fixedly installed at the monitoring place, but the photographing recording system of the present technology is not limited to this example, and can be effectively applied when an image whose degree of importance periodically changes is photographed.

Further, in the first and second embodiments, the control unit 121 includes the average degree of importance calculating unit 13 that calculates the average degree of importance based on the degrees of importance of a plurality of past times corresponding to the current time in the degree of importance period, and the image quality control parameter calculating unit 14 calculates the image quality control parameter based on the average degree of importance. However, the image quality control parameter calculating unit 14 may calculate the image quality control parameter using the degree of importance of the time corresponding to the current time in the degree of importance period immediately before the current time together with the average degree of importance described in the above embodiments instead of the average degree of importance described in the above embodiments. The image quality control parameter calculating unit 14 may be configured not to include the average degree of importance calculating unit 13 when the degree of importance of the time corresponding to the current time in the degree of importance period immediately before the current time is used instead of the average degree of importance.

Further, in the first and second embodiments, the image encoding device 120 includes the degree of importance period calculating unit 12, but the image encoding device 120 may be configured not to include the degree of importance period calculating unit 12. In this case, the image encoding device 120 may receive the degree of importance period designated from the outside. For example, when the user is aware of the degree of importance period, the user may set the degree of importance period to the image encoding device 120, and the average degree of importance calculating unit 13 may calculate the average degree of importance using the set degree of importance period. For example, the user may set the operating period of time of the image encoding device 120 in one day to the image encoding device 120 as the degree of importance period or may set the operating period of time of the image encoding device 120 in one week to the image encoding device 120 as the degree of importance period.

Further, in the first and second embodiments, the image encoding device 120 includes the degree of importance calculating unit 11, but the image encoding device 120 may be configured not to include the degree of importance calculating unit 11. In this case, the image encoding device 120 may acquire a degree of importance which is externally calculated based on consecutively input images on each of consecutively input images. Further, a degree of importance need not be necessarily calculated based on the input image.

For example, a degree of importance may be calculated based on a detection value of a motion sensor or the like installed at a gate of a store.

Further, in the above embodiments, the frame rate adjusted by the imaging unit 111 and the resolution adjusted by the signal processing unit 112 have been described as an example of the image quality control parameter, but the frame rate and the resolution may be adjusted by the image encoding unit 122.

The preferred embodiment of the present technology at the present time have been described above, but various changes can be made on the present embodiment, and all changes made within the spirit and scope of the present technology are intended to be included in claims set forth below.

The present technology has effects enabling an encoding of an input image using a parameter according to a change in an actual degree of importance to generate video data, and is useful as an image encoding device that encodes a plurality of input images which are consecutively input and generates video data, or the like.

This application claims the benefit of Japanese Priority Patent Application JP 2013-052737 filed on Mar. 15, 2013, the entire contents of which are incorporated herein by reference.

What is claimed is:

1. An image encoding device, comprising:
a memory that stores instructions, and
a processor that executes the instructions,
wherein, when executed by the processor, the instructions cause the device to perform operations including:
initializing an image quality control parameter and calculating an update of the image quality control parameter based on a degree of importance of a past time corresponding to a current time in a degree of importance period, which is a period of a degree of importance of a plurality of input images which are consecutively input;
encoding the input images using the image quality control parameter and generating video data; and
calculating a complexity of the video data generated by the image encoder,
wherein the updated image quality control parameter is calculated based on the complexity.

2. The image encoding device according to claim 1,
wherein the calculating an update calculates an image quality control parameter based on an average degree of importance, which is an average of degrees of importance of a plurality of past times corresponding to the current time in the degree of importance period.

3. The image encoding device according to claim 2, further comprising,
calculating an average degree of importance based on the degrees of importance, of the plurality of past times corresponding to the current time in the degree of importance period.

4. The image encoding device according to claim 1, further comprising:
calculating a degree of importance based on the input images; and
calculating the degree of importance period based on the degree of importance.

5. The image encoding device according to claim 1,
wherein the calculating an update calculates the image quality control parameter based on a degree of importance of a past time corresponding to the current time using an operating period of time of the image encoding device in one day as the degree of importance period.

6. The image encoding device according to claim 1,
wherein the calculating an update calculates the image quality control parameter based on a degree of importance of a past time corresponding to the current time using an operating period of time of the image encoding device in one week as the degree of importance period.

7. The image encoding device according to claim 4,
wherein the calculating an update calculates the image quality control parameter further based on a current degree of importance, which is a degree of importance of an input image of the current time calculated by the calculating the degree of importance.

8. The image encoding device according to claim 7,
wherein the calculating an update calculates the image quality control parameter to be proportional to an average of the current degree of importance and the average degree of importance corresponding to a plurality of periods.

9. The image encoding device according to claim 7,
wherein the calculating an update calculates the image quality control parameter to be proportional to a larger one of the current degree of importance and the average degree of importance.

10. The image encoding device according to claim 7,
wherein the calculating an update calculates the image quality control parameter based on a comparison between the current degree of importance and the average degree of importance and a comparison between the current degree of importance or the average degree of importance and a certain threshold value.

11. The image encoding device according to claim 2,
wherein the calculating an update calculates the image quality control parameter to be proportional to the average degree of importance based on only the average degree of importance.

12. The image encoding device according to claim 1, further comprising:
calculating a complexity period which is a period of the complexity; and
calculating an average image complexity in a period of an integer multiple of the complexity period,
wherein the calculating an update calculates the image quality control parameter based on the average image complexity.

13. The image encoding device according to claim 12,
wherein the period of the integer multiple of the complexity period is a common period which is an integer multiple of the degree of importance period.

14. The image encoding device according to claim 4,
wherein the calculating a degree of importance calculates the degree of importance based on whether a certain subject is included in the input image.

15. The image encoding device according to claim 14,
wherein the calculating a degree of importance calculates the degree of importance based on a comparison between a model of a subject of a certain type and the input image.

16. The image encoding device according to claim 14,
wherein the calculating a degree of importance calculates the degree of importance based on a comparison between a certain image and the input image.

17. The image encoding device according to claim 4,
wherein the calculating a degree of importance calculates the degree of importance based on a magnitude of a temporal change of the input image and/or a magnitude of a spatial change of the input image.

18. The image encoding device according to claim 1,
wherein the image quality control parameter is a parameter representing whether the image encoder is to encode the input image.

19. A photographing system, comprising:
the image encoding device according to claim 1;
an imager that photographs a subject and generates a video signal; and
a signal processor that processes the video signal and generates the input image.

20. The photographing system according to claim 19,
wherein the image quality control parameter is a photographing frame rate in the imager.

21. The photographing system according to claim 19,
wherein the image quality control parameter is a resolution used to generate the input image in the signal processor.

22. A photographing recording system, comprising:
the photographing system according to claim 19; and
a recorder that is connected to perform communication with the photographing system, and records video data generated by the image encoding device.

23. An image encoding method, comprising:
initializing an image quality control parameter;
calculating an update of the image quality control parameter based on a degree of importance of a past time corresponding to a current time in a degree of importance period, which is a period of a degree of importance of a plurality of input images which are consecutively input;
encoding the input images using the image quality control parameter and generating video data; and
calculating a complexity of generated video data,
wherein the updated image quality control parameter is calculated based on the complexity.

24. A non-transitory computer readable medium storing an image encoding program causing a computer to:
initialize an image quality control parameter;
calculate an update of the image quality control parameter based on a degree of importance of a past time corresponding to a current time in a degree of importance period, which is a period of a degree of importance of a plurality of input images which are consecutively input;
encode the input images using the image quality control parameter and generate video data; and
calculate a complexity of the generated video data,
wherein the updated image quality control parameter is calculated based on the complexity.

* * * * *